United States Patent [19]
Ross et al.

[11] Patent Number: 5,562,799
[45] Date of Patent: Oct. 8, 1996

[54] CONSTANT FUSING PRESSURE THERMOPLASTIC LID SEALING APPARATUS AND METHOD

[75] Inventors: Edward E. Ross, San Rafael; Terry D. Donnelly, Fresno, both of Calif.

[73] Assignee: Del Monte Corporation, San Francisco, Calif.

[21] Appl. No.: 260,191

[22] Filed: Jun. 15, 1994

[51] Int. Cl.$^6$ .................................................. B32B 31/00
[52] U.S. Cl. .................... 156/567; 156/69; 156/583.1; 156/583.5; 156/583.91; 198/626.1; 413/5; 493/108
[58] Field of Search .................................. 156/567, 582, 156/583.1, 583.5, 583.91, 156, 306.6, 308.2, 69; 198/626.1, 626.5, 626.6; 413/5, 7, 45, 52; 493/102, 104, 108

[56] References Cited

U.S. PATENT DOCUMENTS

| 1,715,352 | 6/1929 | Chalmers | 413/52 |
| 3,189,505 | 6/1965 | Sloan et al. | 53/478 X |
| 3,210,910 | 10/1965 | Seefluth | 493/102 X |
| 4,552,189 | 11/1985 | Ross . | |
| 5,125,528 | 6/1992 | Heyn et al. . | |
| 5,246,134 | 9/1993 | Roth et al. . | |

*Primary Examiner*—James Engel
*Attorney, Agent, or Firm*—Flehr, Hohbach, Test, Albritton & Herbert

[57] ABSTRACT

A lid sealing apparatus (30) and method for induction heat sealing a heat-sealable lid (15) to a can body (21). The lid sealing apparatus (30) includes a first conveyor assembly (34) having a plurality of independent, transversely mounted side-by-side support shoes (35) of relative rigidity collectively cooperating to define a segmented first surface (36) for supporting and moving the can (21) along a pathway. A second conveyor assembly (37) is oriented adjacent to the first conveyor assembly (34) and includes a relatively rigid second surface (40) in opposed moving relation to the first surface (36). A plurality of individual spring suspension mechanisms (43) are operably mounted to the frame (33) and provide moving support to each support shoe (35) as it moves along the pathway. Each spring suspension mechanism (43) individually biases the first Conveyor first surface (36) toward the second conveyor second surface (40) to provide a substantially constant fusing pressure between a can open end (20) and the lid (15) as the two travel as a unit. The plurality of individual spring suspension mechanisms (43) is sufficient in number relative to conveyor speed to hold the lid against the can open end for a duration allowing melting and the thermal fusion of the lid to the can open end. The lid sealing apparatus can be adapted for either a linear or rotary design.

104 Claims, 12 Drawing Sheets

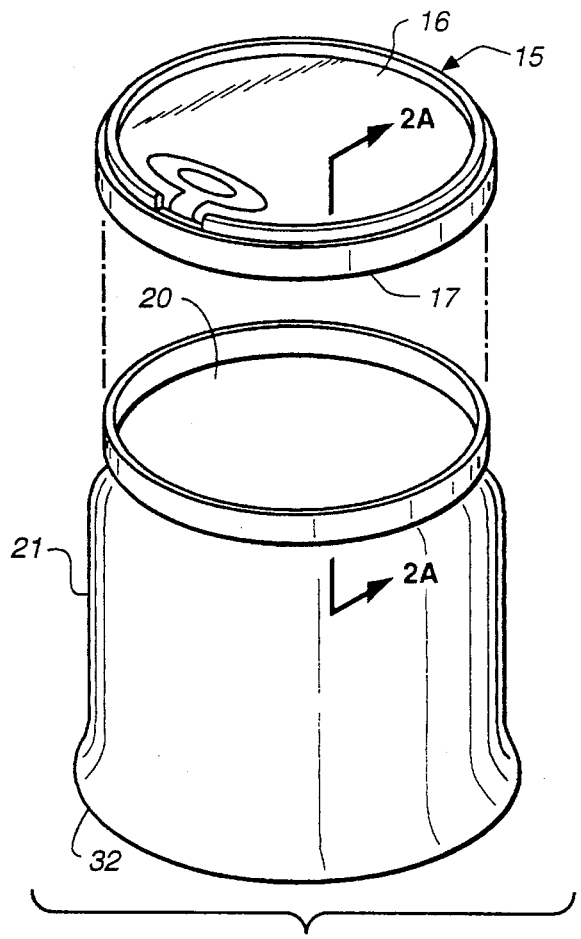
FIG._1A (PRIOR ART)
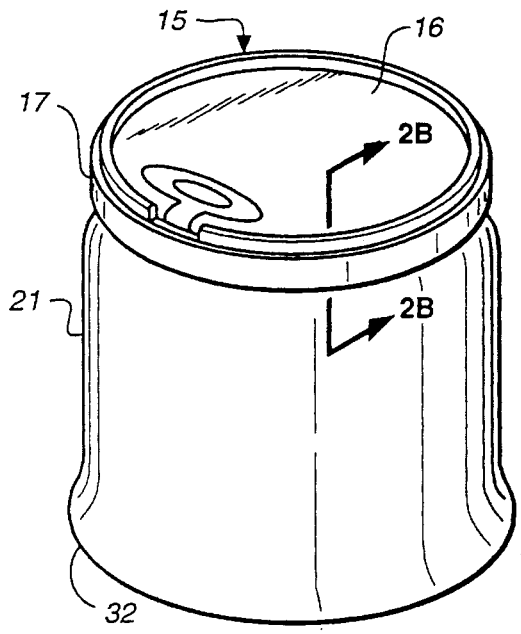
FIG._1B (PRIOR ART)
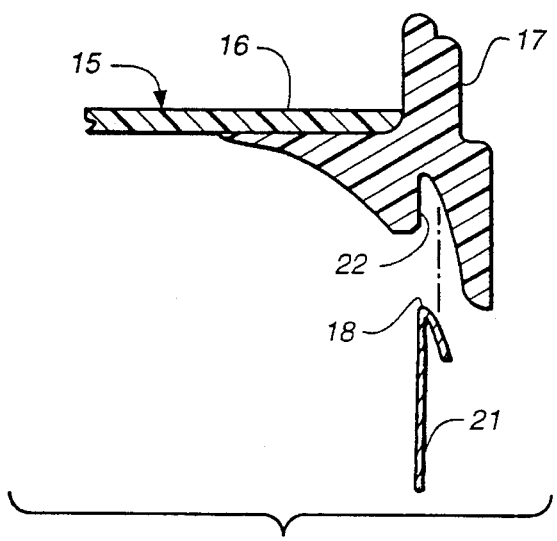
FIG._2A (PRIOR ART)
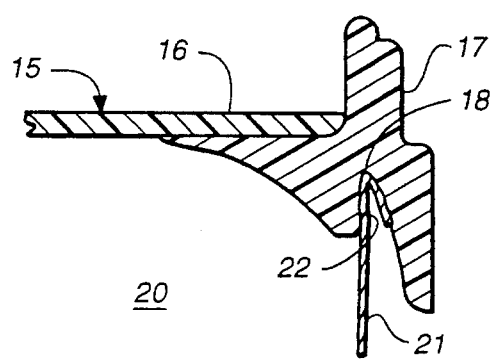
FIG._2B (PRIOR ART)

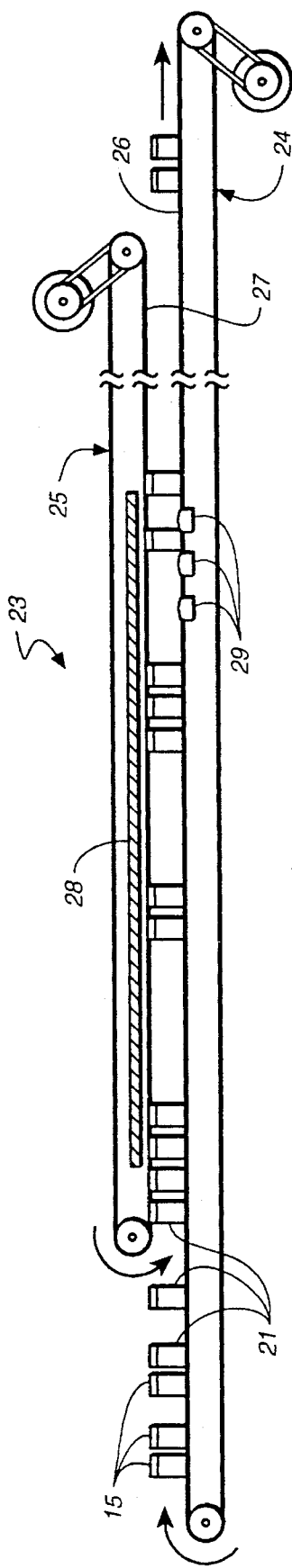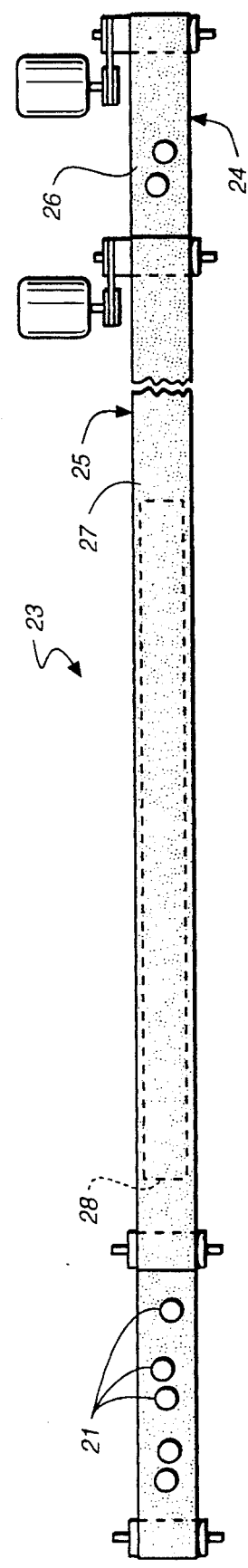
FIG._3 (PRIOR ART)
FIG._4 (PRIOR ART)

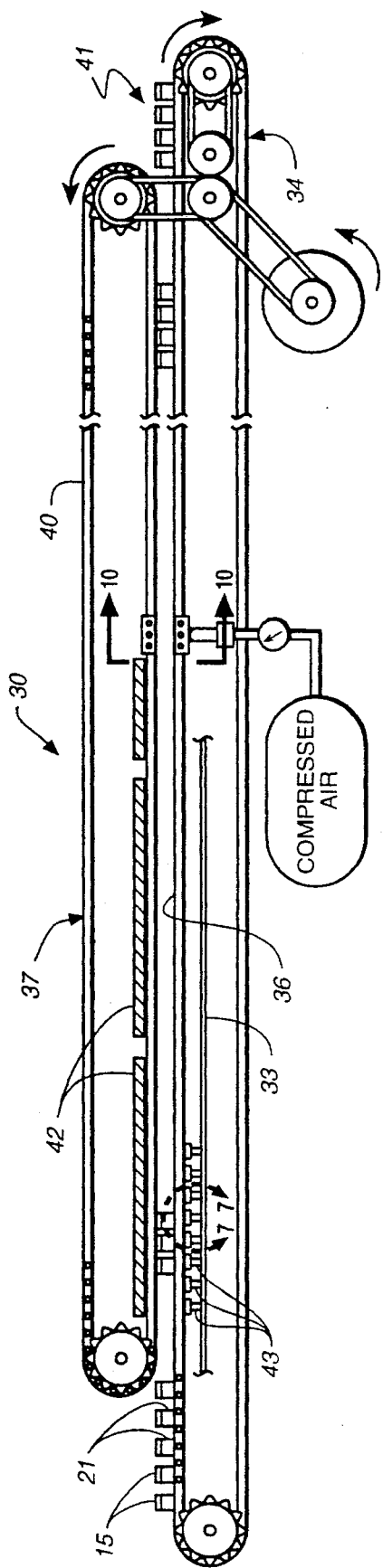
FIG._5
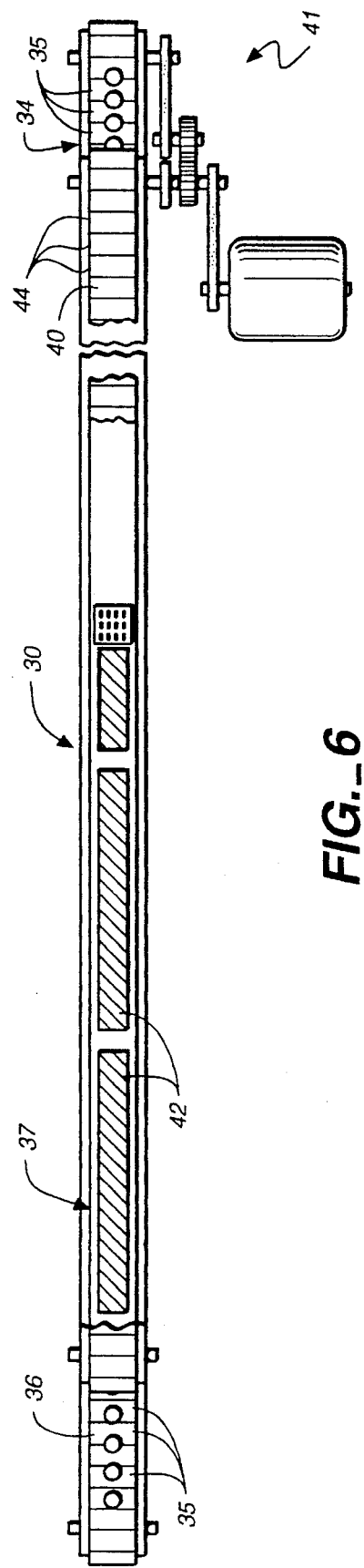
FIG._6

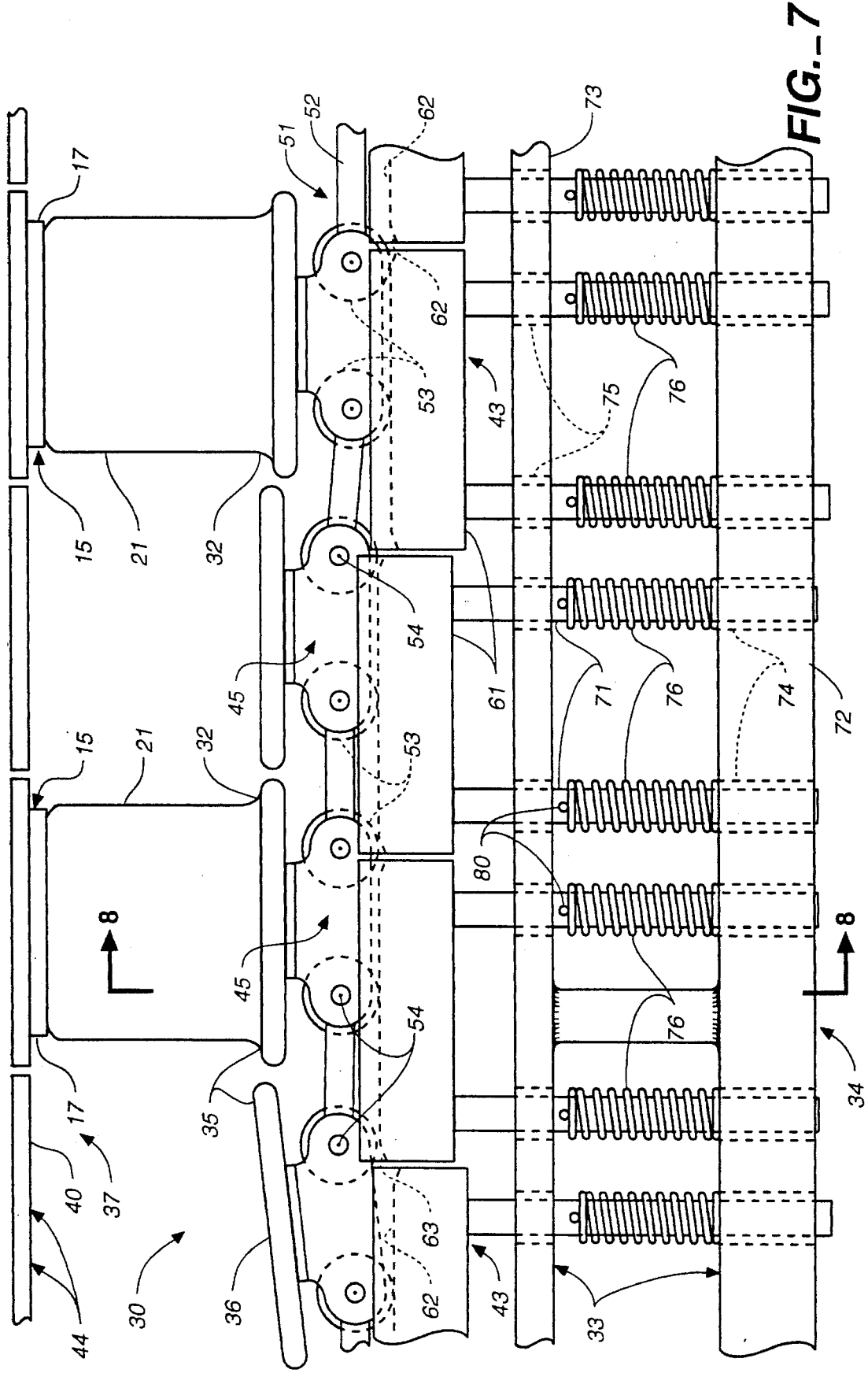
FIG._7

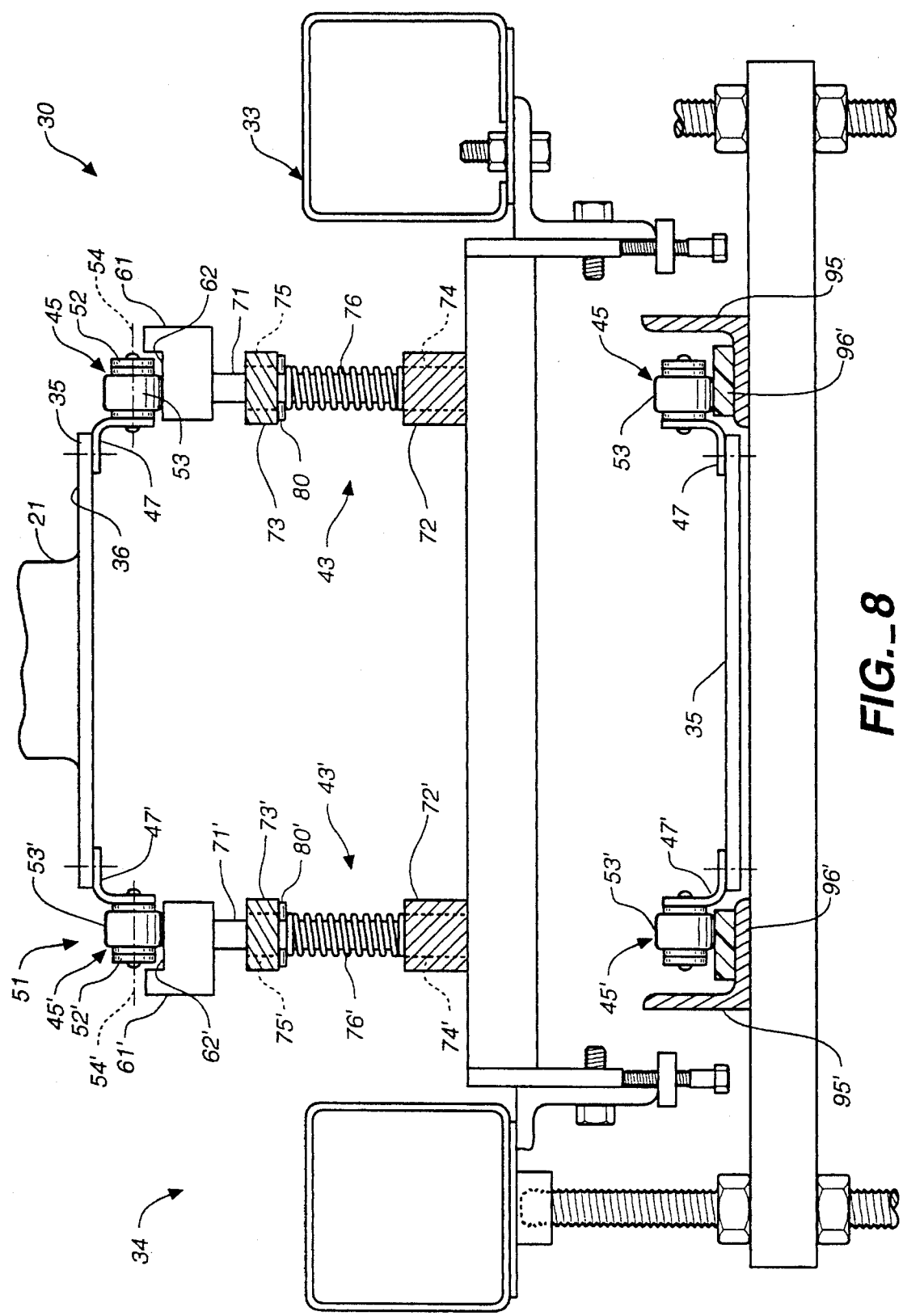
FIG._8

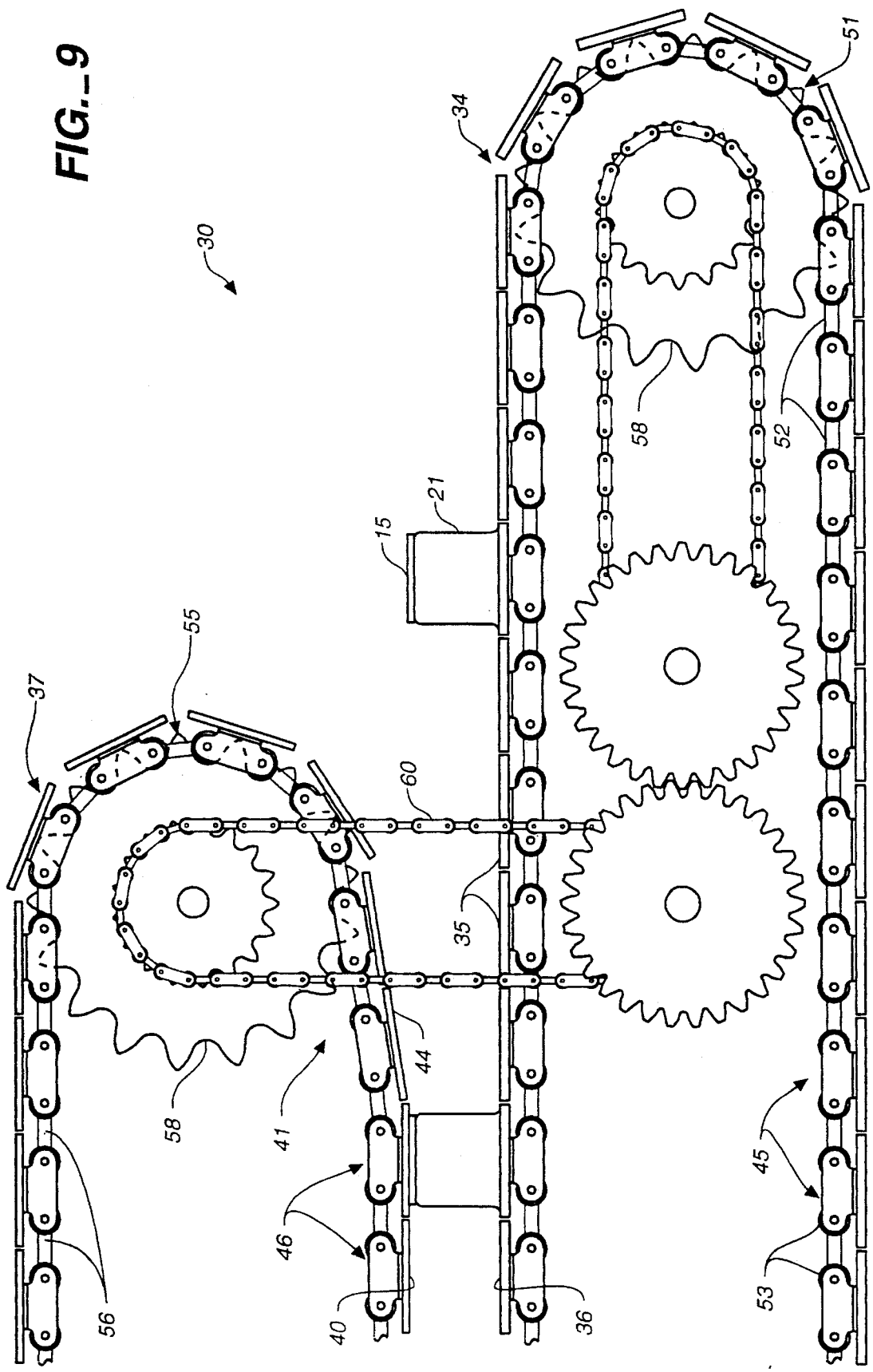
FIG._9

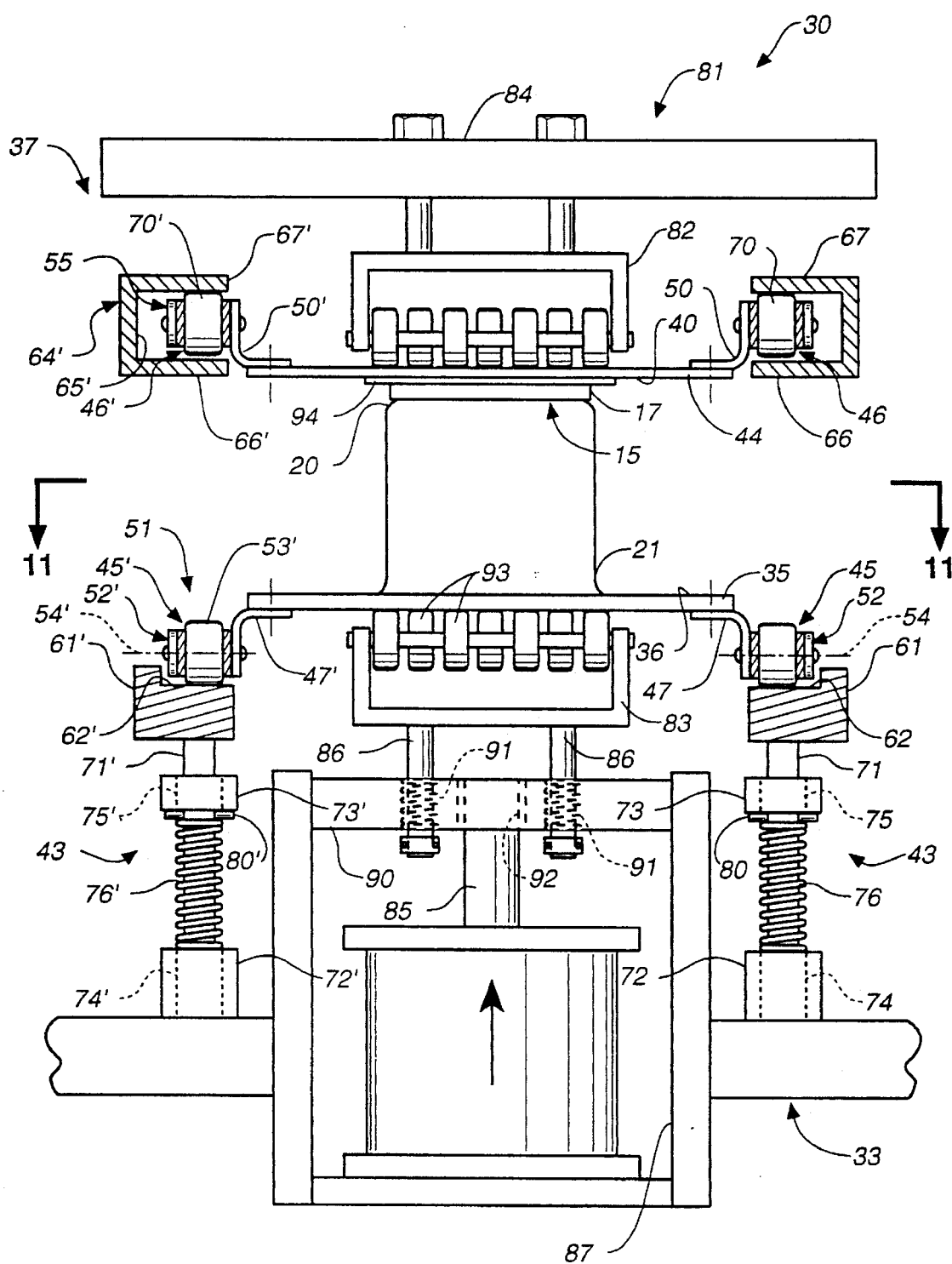
FIG._10

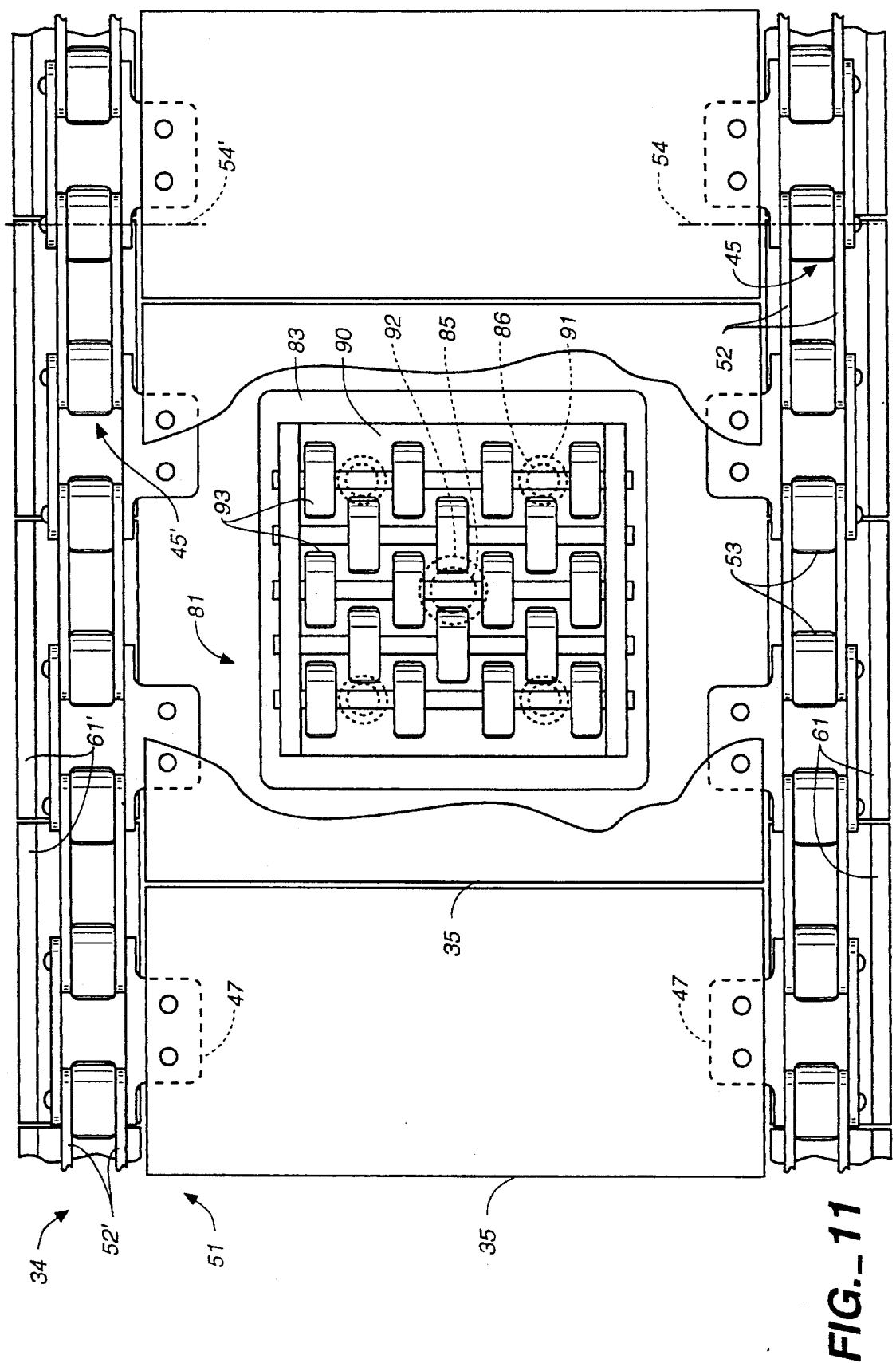

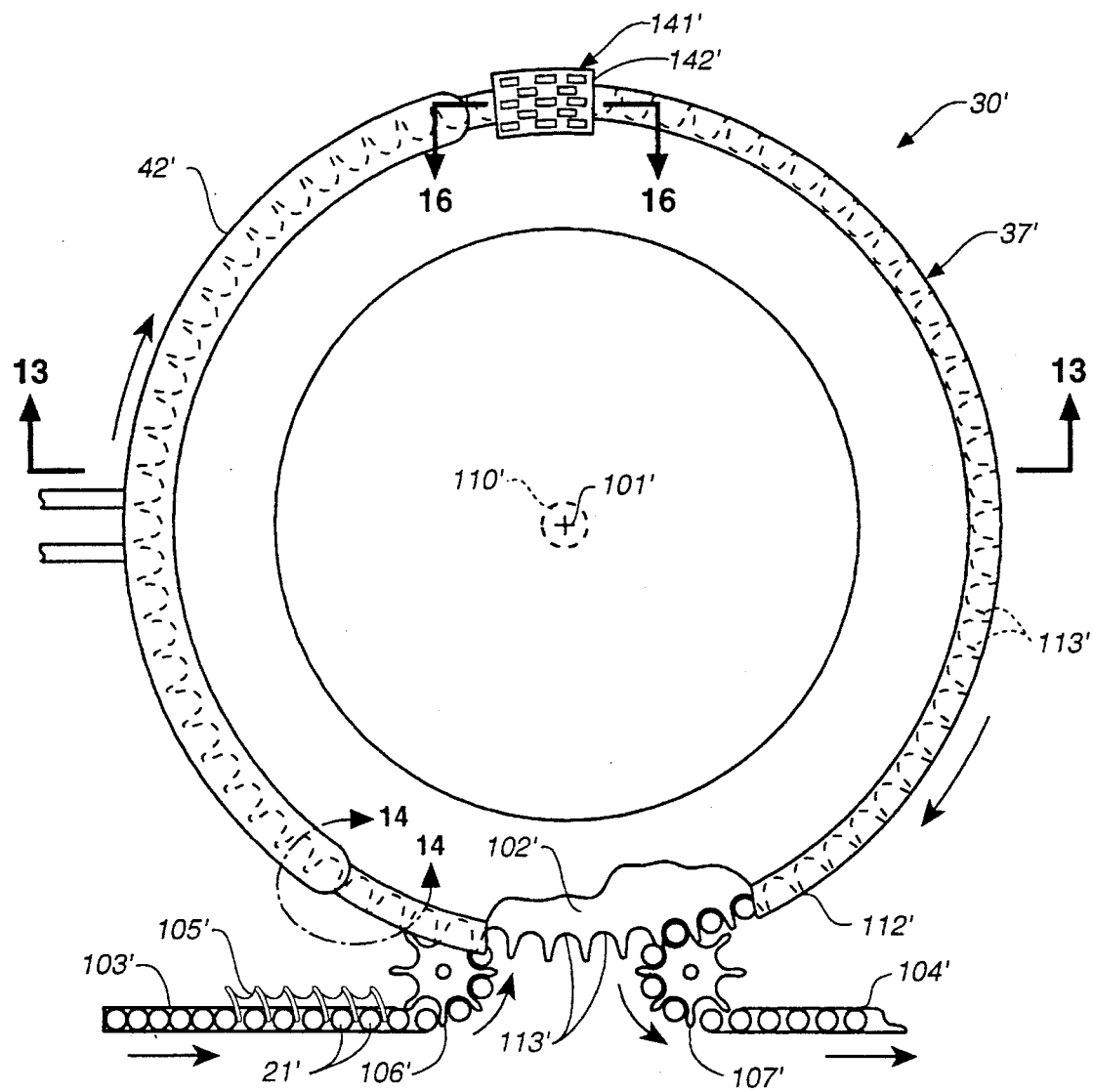
FIG._12
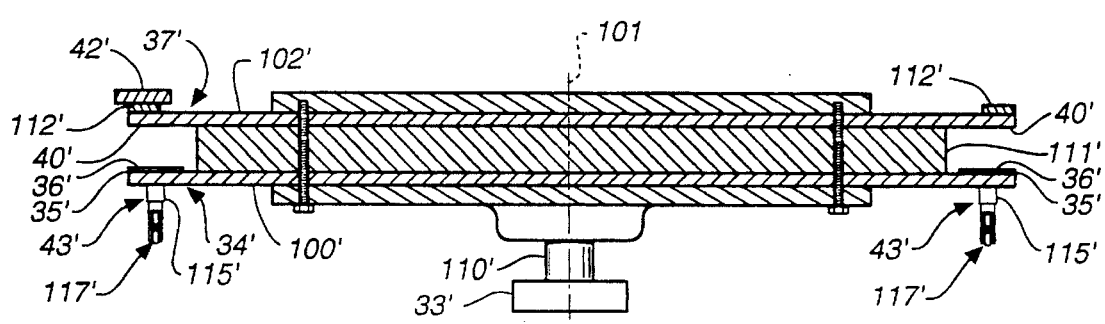
FIG._13

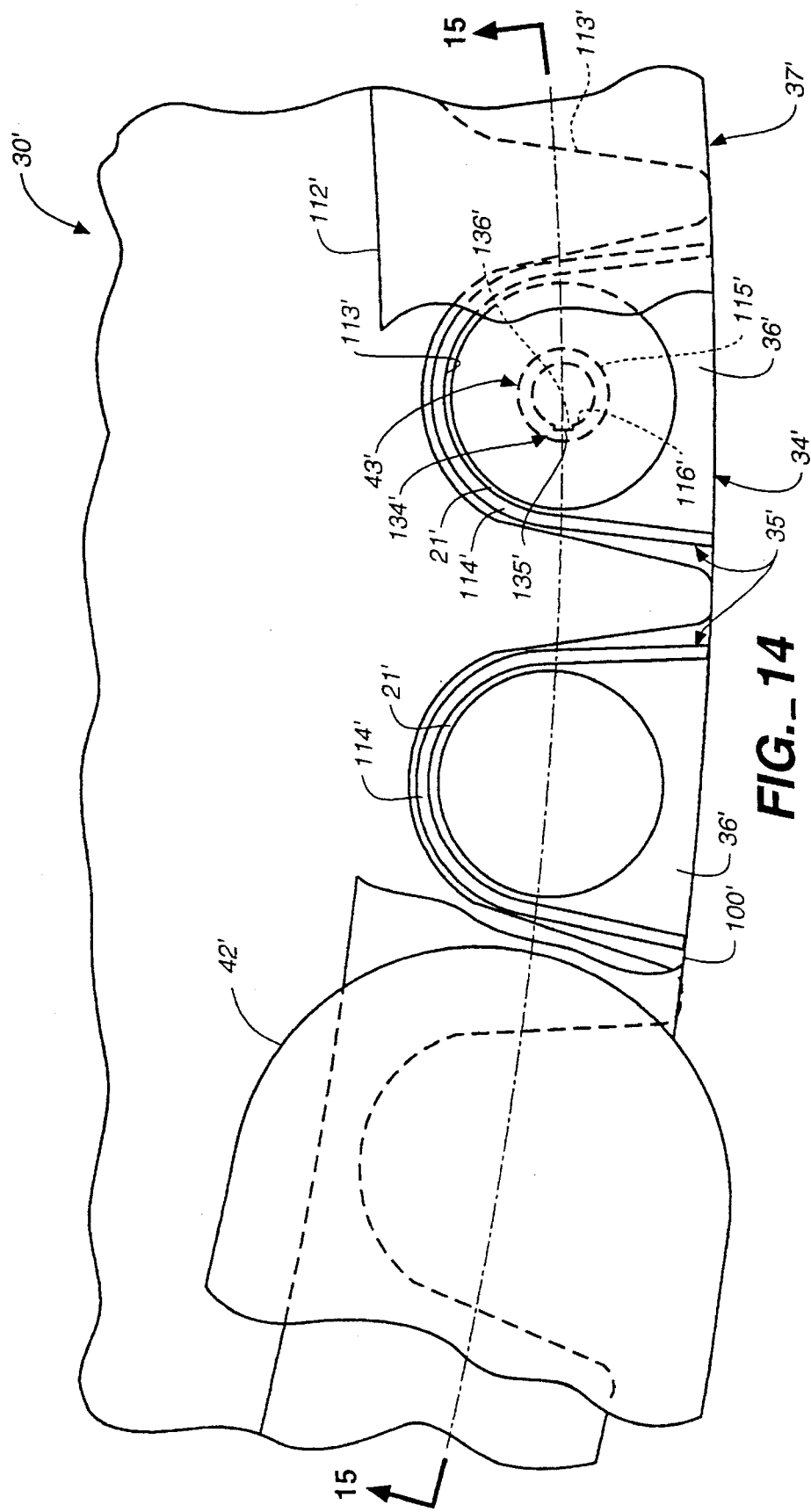

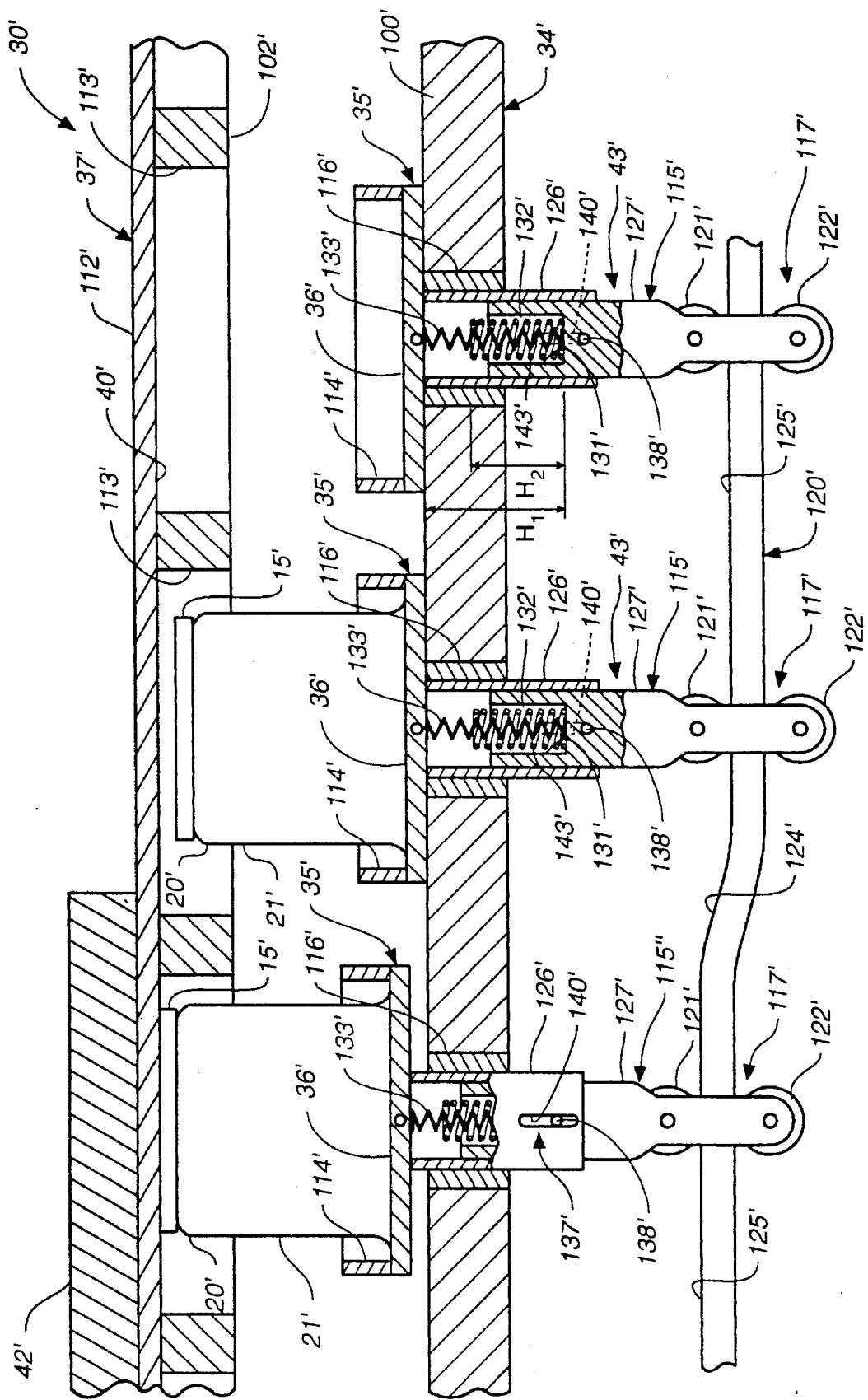
FIG._15

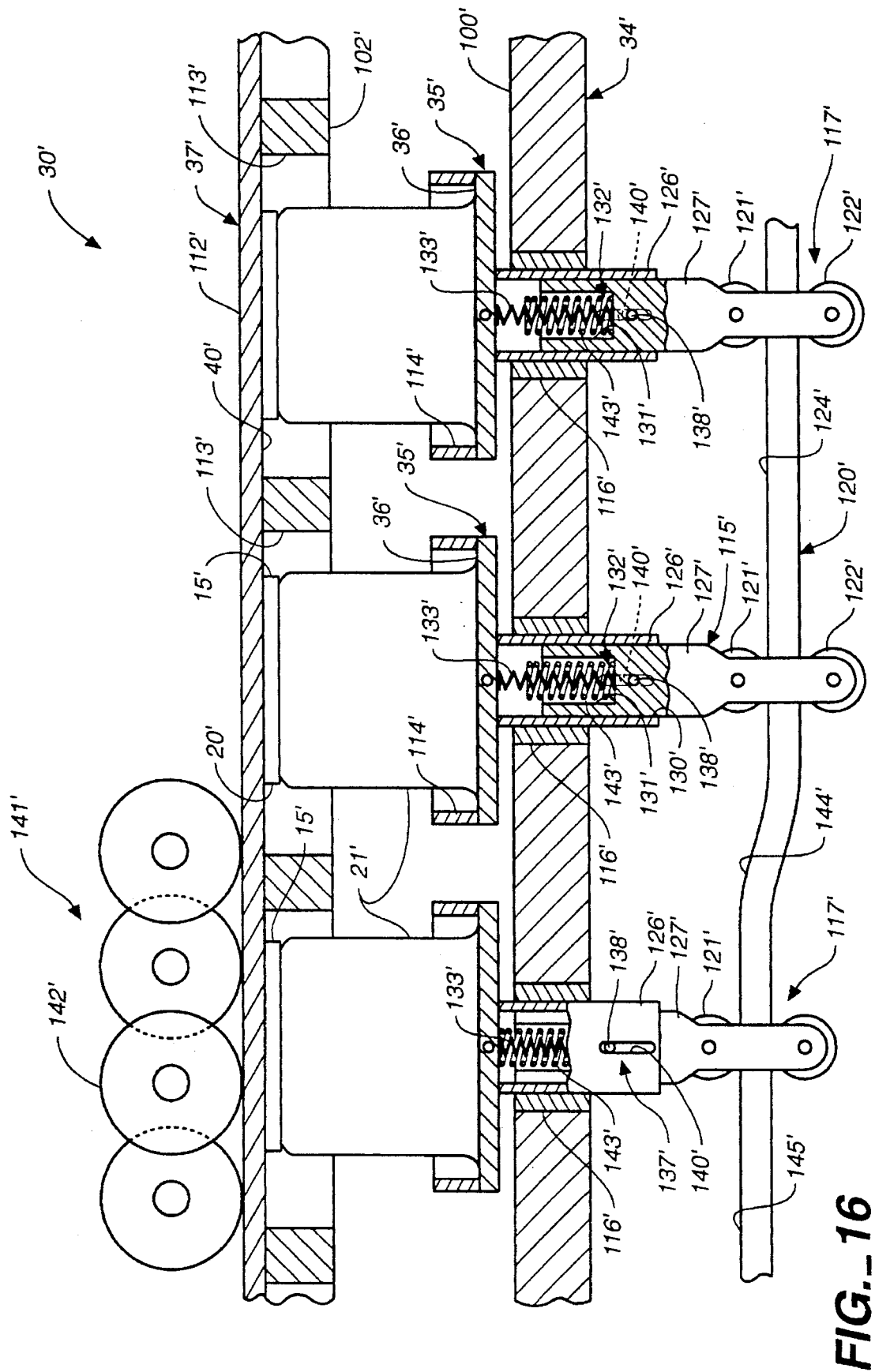
FIG._16

CONSTANT FUSING PRESSURE THERMOPLASTIC LID SEALING APPARATUS AND METHOD

TECHNICAL FIELD

The present invention relates, generally, to lid sealing apparatus, and, more particularly, relates to thermoplastic lid sealing apparatus fused through a substantially constant fusing pressure.

BACKGROUND ART

Peelable lids for canned goods, such as foods items or the like, are generally comprised of deformable steel or aluminum lids clinch double seam-sealed to a steel or aluminum can body. These lids are problematic and disadvantageous in many respects. For instance, they pose serious health hazards for children as they may cut themselves on the exposed edge of the peeled lid when licking the lid or the can flange. Difficulties are also encountered when manually breaking the seal and subsequently peeling the metallic lids off the can body. Further, the metallic lids, when separated from the can, are often discarded as waste rather than being recycled.

Recently, significant advances have been made in canning technology which have replaced the steel or aluminum peelable lids with thermoplastic peelable lids which are heat-sealed to metallic bodied cans. As shown in FIG. 1 and 2, these thermoplastic lids 15 include a peelable lid portion 16 premounted or preformed on a thermoplastic fusing ring portion 17 which is to be heat fused to a circumferential flange 18 at an open end 20 into a metallic can body 21. FIGS. 2A and 2B illustrate that fusing ring 17 includes an annular groove 22 formed for receipt of circumferential flange 18 therein (FIG. 2A). By applying the appropriate heat and pressure, to be described in greater detail below, fusing ring 17 is fused to can flange 18.

Once these thermoplastic lids 15 are fused to can body 21, these lids have proven easier to open and are safer to use by children than metallic lids in that the edges of the thermoplastic lid and flange may be licked without concern for injury. In addition, while these lids are completely recyclable, they do not pose as significant an environmental waste when discarded as disposed metallic goods. Typical of these heat-sealable thermoplastic lids may be found in U.S. Pat. Nos. 5,246,134 to Fraser et al.; and 5,125,528 to Heyn et al.

While these thermoplastic peelable lids are superior in form and function, as compared to metallic peelable lids, these arrangements are difficult to manufacture. Because lid 15 is deformable, to fuse ring portion 17 to can body flange 18, the can body 21 must be heated quickly to a sufficient temperature for localized contact melting of the lid. During the heating of the can body, a fusing pressure is continuously applied between the can and the thermoplastic lid to induce melting through conductive contact. Once the fusing ring portion is sufficiently melted, the fusing pressure is substantially increased to facilitate adhesion between the two fused components. Since this technique enhances adhesion, the burst pressure of the seal is also substantially increased.

Through capping machinery already known in the field, the thermoplastic lid can be automatically seated and oriented atop the can body for mounting engagement with flange 18. Subsequently, the can/lid combination is positioned to enter a lid sealing machine 23 for fusing of the lid to the can body. As shown in FIGS. 3 and 4, current thermoplastic lid sealing technology places the can/lid combination in an upright position which is movably supported on a first belt conveyor assembly 24. A second belt conveyor assembly 25 is positioned in opposed relation to first belt conveyor assembly 24 which cooperates therewith to apply a continuous fusing pressure between the can and the lid, and to drive the can/lid combination along a pathway formed between the first and second conveyor assemblies. The first and second conveyor assemblies 24, 25 include opposing drive belts 26, 27, respectively, which are positioned a fixed predetermined distance apart which squeeze the can and lid together to create the continuous fusing pressure as the can/lid combination passes therethrough.

To heat can body 21, the second conveyor assembly includes an induction heating coil 28 (FIG. 4) extending longitudinally along the pathway just above upper drive belt 27. This coil quickly heats the can body as it passes through a electromagnetic field created by coil 28 which induces a current through the can body causing it to heat up and melt the thermoplastic ring.

A set of shims 29 are positioned under first conveyor assembly belt 24 downstream from induction heating coil 28 which creates a pressure bump in the pathway. This increase in fusing pressure, substantially greater than the continuous fusing pressure applied between the opposing belts, enhances seal integrity which increases the can bursting pressure. As the can flange heats and melts the plastic in contact therewith, the fusing pressure pushing the lid and can together begins to decrease. This occurs because the distance between opposing belts 26, 27 is fixed, and as the plastic lid melts onto the flange, the can/lid height combination decreases. During continued melting of the plastic fusing ring, the lid begins to float on the liquid plastic. Insertion of shims 29 under the lower belt 26 forces can body 21 up against the lid as the belt carries the can through this shimmed region. The substantially increased pressure helps heat transfer from the can flange to the plastic and helps prevent the melted plastic from vaporizing and causing bubbles in the seal area. Subsequently, upon cooling, the cans are ready for filling and seaming of the metallic can bottom to the can body.

While this thermoplastic can sealing machine is adequate when all components of the machine are functioning properly, many mechanical and sealing problems are associated with these first generation machines. Severe problems may occur when the can height varies by as little as 0.03 inches. Since the predetermined distances between the opposing belts are fixed, even at the pressure bump area, tall cans may penetrate the flange of the can too deeply into the thermoplastic lid which can deform or crush the can body. In contrast, too short of a can may not penetrate the flange deep enough into the thermoplastic fusing ring which adversely affects seal integrity. Additionally, tilting of the lids can occur when the fused lids are not constantly urged against can flange after passing through the pressure bump region during cooling and solidification of the thermoplastic lid to the can body.

Moreover, when this prior art sealing apparatus 23 is transporting, heating, fusing and curing a plurality of cans between the conveyors, simultaneously, one or both of the belt drives 26, 27 sometimes slips relative one another. This causes differences in the relative speed between lower belt 26 and upper belt 27 which, even with small speed differences when transported along the pathway, can cause the warm plastic lid to creep. This creep may deform the lid from its normal symmetrical shape, again potentially affecting seal integrity. Finally, malfunction of the capping machine may cause severe damage to the drive belts. As the can heats up during passage through the induction heating coils, contact of the heated can flange with the thin plastic belts can burn holes therethrough which ultimately requires frequent replacement of the belts.

DISCLOSURE OF INVENTION

Accordingly, it is an object of the present invention to provide a thermoplastic lid sealing apparatus and method which improves seal integrity between the thermoplastic lid and the metallic can body.

Another object of the present invention is to provide a thermoplastic lid sealing apparatus and method which automatically compensates for height differences in the can body.

Yet another object of the present invention is to provide a thermoplastic lid sealing apparatus and method which substantially reduces speed differences between opposing conveyors.

Still another object of the present invention is to provide a thermoplastic lid sealing apparatus and method which decreases maintenance and replacement of the conveyor components.

It is a further object of the present invention to provide a thermoplastic lid sealing apparatus and method which is durable, compact, easy to maintain, has a minimum number of components, and is economical to manufacture.

In accordance with the foregoing objects, one embodiment of the present invention provides a lid sealing apparatus for sealing a heat-sealable lid to a can having an open end upon which the lid is to be fused and an opposite end. The lid sealing apparatus includes a frame, and a first conveyor assembly coupled to the frame. The first conveyor assembly includes a plurality of independent, transversely mounted side-by-side support shoes of relative rigidity collectively cooperating to define a segmented first surface for supporting and moving the can along a pathway. A second conveyor assembly is coupled to the frame and extends along and is adjacent to the first conveyor assembly. The second conveyor assembly includes a relatively rigid second surface in opposed moving relation to the first surface for further transport of the can between the first and second conveyor assemblies along the pathway. A heating element is positioned along a portion of one of the first surface and the second surface. This element is formed to thermally fuse the lid to the can open end. Further, a plurality of individual spring suspension mechanisms is operably mounted to the frame and provides moving support to each support shoe as it moves along the pathway. Each spring suspension mechanism individually biases the first surface of the first conveyor assembly toward the second surface of the second conveyor assembly to provide a substantially constant fusing pressure between the can open end and the lid as the two travel as a unit. The constant fusing pressure being sufficient in duration relative to conveyor speed to hold the lid against the can open end to allow melting and thermal fusion of the lid to the can open end.

A synchronism mechanism is operably coupled between the first conveyor assembly and the second conveyor assembly to synchronize the speed of passage of the first surface with the second surface through the pathway while carrying the can between the first surface and the opposing second surface.

Further, a pressure bump device is operably coupled to at least one of the first conveyor assembly and the second conveyor assembly for causing a substantially constant high pressure between the lid and the can open end substantially greater than the constant fusing pressure applied by the suspension mechanisms. This increased pressure substantially improves fusing adhesion between the components. This bump device is located at a position along a portion of the pathway where the can/lid combination has been sufficiently heated to melt and fuse the lid to the can open end.

The present invention can be operably applied to both linear and rotary-type conveyors. In a linear conveyor embodiment of the present invention, each support shoe includes a roller mechanism rotatably mounted at opposing transverse ends thereof to provide rolling support of each shoe as it travels over the spring suspension mechanisms during passage through the pathway. Further, each spring suspension mechanism includes a pair of individual spaced-apart presser shoes each having a roller surface positioned to engage and provide the rolling support to the corresponding roller mechanism. Each independent pair of presser shoes cooperates with adjacent pairs of presser shoes to form the pathway.

In the rotary-type conveyor embodiment of the present invention, the first conveyor assembly includes a base plate rotatably mounted to the frame about an axis for movement along a circular pathway. A plurality of bearings are circumferentially mounted about the axis to said base plate, where each bearing corresponds to one spring suspension mechanism. Each suspension mechanism includes a sliding shaft slidably coupled to the corresponding bearing. One end of the sliding shaft is mounted to a corresponding support shoe and an opposite end thereof is movably mounted to the frame to produce sliding movement of the corresponding support shoe first surface toward the second surface of the second conveyor assembly.

In another aspect of the present invention, a method of fusing a heat-sealable lid to an open end of a can using the above-described lid sealing apparatus comprising the steps of positioning the lid on the can open end, placing the can body and the lid between the first conveyor first surface and the second conveyor second surface for transport along said pathway. Next, heating the can body along a portion of one of the first surface and the second surface to a temperature sufficient to thermally fuse the lid to the can open end. Finally, holding the lid against the open end of the can body at a substantially constant fusing pressure, regardless of variations in can height, between the can open end and the lid for a duration allowing melting and thermal fusion of the lid to the can open end as the can and the lid travel as a unit along the pathway between the first and the second conveyor.

BRIEF DESCRIPTION OF THE DRAWINGS

The assembly of the present invention has other objects and features of advantage which will be more readily apparent from the following description of the Best Mode of Carrying Out the Invention and the appended claims, when taken in conjunction with the accompanying drawing, in which:

FIG. 1A is an exploded top perspective view of a prior art thermoplastic lid before being thermally fused to a metallic can body.

FIG. 1B is a top perspective view of the prior art thermoplastic lid thermally fused to the metallic can body.

FIG. 2A is a fragmentary, enlarged, side elevation view, in cross-section, of the thermoplastic lid and metallic can body taken substantially along the plane of line 2A—2A of FIG. 1A.

FIG. 2B is a fragmentary, enlarged, side elevation view, in cross-section, of the thermoplastic lid thermally fused to the metallic can body taken substantially along the plane of line 2B—2B of FIG. 1B.

FIG. 3 is a schematic side elevation view of a prior art induction coil lid sealing apparatus.

FIG. 4 is a top plan view of the prior art induction coil lid sealing apparatus of FIG. 3.

FIG. 5 is a fragmentary, schematic side elevation view, partially broken-away, of a constant fusing pressure thermoplastic lid sealing apparatus constructed in accordance with the present invention and as incorporated in a linear-type conveyor assembly.

FIG. 6 is a top plan view, partially broken-away, of the constant fusing pressure thermoplastic lid sealing apparatus of FIG. 5.

FIG. 7 is a fragmentary, enlarged, side elevation view of the individual suspension mechanisms of a first conveyor assembly of the present invention taken substantially along the line 7—7 of FIG. 5.

FIG. 8 is a fragmentary, reduced, front elevation view, in cross-section, of the first conveyor assembly of the present invention taken substantially along the plane of the line 8—8 of FIG. 7.

FIG. 9 is a fragmentary, enlarged, side elevation view of a chain and drive sprocket mechanism operably coupled with a mechanical synchronism mechanism of the present invention taken substantially along the line 9—9 of FIG. 5.

FIG. 10 is a fragmentary, enlarged, front elevation view of a pressure bump device of the present invention taken substantially along the plane of the line 10—10 of FIG. 5.

FIG. 11 is a top plan view, in cross-section, of the pressure bump device taken substantially along the plane of the line 11—11 of FIG. 10.

FIG. 12 is a fragmentary, top plan view, partially broken-away, of an alternate embodiment of the present invention incorporated in a rotary-type conveyor assembly.

FIG. 13 is a side elevation view, in cross-section, of the rotary conveyor lid sealing apparatus taken substantially along the plane of the line 13—13 of FIG. 12.

FIG. 14 is an enlarged, fragmentary, top plan view of the individual suspension mechanisms of the alternate embodiment of the present invention taken substantially along the line 14—14 of FIG. 12.

FIG. 15 is a fragmentary side elevation view, in partial cross-section, of the individual suspension mechanisms engaging a cam track and taken substantially along the plane of the line 15—15 of FIG. 14.

FIG. 16 is an enlarged, fragmentary side elevation view, in partial cross-section, of the individual suspension mechanisms at the pressure bump region and taken substantially along the plane of the line 16—16 of FIG. 12.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 5 and 6 where a linear-conveyor embodiment of a lid sealing apparatus, generally designated 30, is illustrated for sealing a heat-sealable lid 15 to a can body 21 having an open end 20 (FIG. 1) upon which thermoplastic lid 15 is to be fused and an opposite end 32 (FIG. 1). Lid sealing apparatus 30 includes an elongated frame 33, and a first conveyor assembly, generally designated 34, coupled to the frame. First conveyor assembly 34 includes a plurality of independent, transversely mounted side-by-side support shoes, generally designated 35, collectively cooperating to define a segmented first surface 36 for supporting and moving the can/lid combination along a pathway. A second conveyor assembly, generally designated 37, is coupled to frame 33 and extends along and is adjacent to first conveyor assembly 34. Second conveyor assembly 37 includes a relatively rigid second surface 40 in opposed moving relation to first surface 36 for further transport of the can/lid combination between the first and second conveyor assemblies along the pathway. A heating element 42 is positioned longitudinally along a portion of one of first surface 36 and second surface 40. This element is formed to thermally fuse lid 15 to can open end 20. Further, a plurality of individual spring suspension mechanisms, generally designated 43, each operably coupled to respective support shoes 35 which individually bias respective first surfaces 36 thereof toward the second surface of the second conveyor assembly to provide a substantially constant fusing pressure between can open end 20 and lid 15 as the two travel as a unit. The plurality of individual spring suspension mechanisms 43 is sufficient in number duration relative to conveyor speed to hold the lid against the can open end for a duration allowing melting and the thermal fusion of the lid to the can open end.

Accordingly, as each can/lid combination passes between the opposing first and second conveyor assemblies 34 and 37, respectively, individual spring suspension mechanisms 43 cooperating with individual support shoes 35 cooperate to squeeze thermoplastic lid 15 and a mounting flange 18 together at a constant fusing pressure during passage through the pathway. These individual spring suspension mechanisms reciprocate to locally increase or decrease the distance between the support shoe first surface 36 and second surface 40 to compensate for can body 21 height variations. A constant fusing pressure is thus applied between the can body and the lid which squeezes and fuses the two together during the localized melting and curing process of the thermoplastic lid. Hence, this novel arrangement eliminates problems associated with can height variation such as too deep a penetration of the can flange 18 into the lid fusing ring portion 17 when the can body height is too tall, or insufficient penetration of the flange into the fusing ring portion when the can body height is too short; both of which degrades seal integrity. Moreover, tilting of the lids due to floating of the melted lid on the can is eliminated by applying a constant fusing pressure between the can body and the thermoplastic lid.

A synchronism mechanism, generally designated 41, operably coupled between first conveyor assembly 34 and second conveyor assembly 37 mechanically synchronizes the speed of passage of the first surface with the second surface through the pathway while carrying the can/lid combination between the first surface and the opposing second surface. By synchronizing the speed of passage, relative slip between the opposing first and second conveyor surfaces is eliminated which substantially eliminates relative speed difference between the same. Accordingly, deformation or creeping of the thermoplastic lids (during curing of the melted lids) is substantially eliminated which is an inherent problem with the prior art lid sealing apparatus.

Referring now to FIGS. 7 and 8, it is shown that first conveyor assembly 34 is mounted to elongated frame 33 and preferably oriented below opposing second conveyor assembly 37. First surface 36, formed by support shoes 35, faces upwardly, while opposing second surface 40 of second conveyor assembly 37, also mounted to frame 33, faces downwardly to form a substantially linear pathway therebetween. The can/lid combination preferably enters sealing apparatus 30 (via, capping machine (not shown)) with can opposite end 32 seated and supported against upward facing support shoe first surface 36. Hence, the can body flange 18, forming the open end, faces second conveyor second surface 40 with the thermoplastic lid therebetween.

Metallic can body 21 is preferably heated by an induction heating coil 42 extending longitudinally along an upstream portion of the pathway. While coil 42 could be position anywhere proximate the upstream portion of the pathway, it is preferably positioned just above the aligned flight bars 44 (FIGS. 5 and 6) of the second conveyor assembly, to be discussed below. As mentioned, these induction coils are advantageous in that they are capable of quickly heating can body 21 without directly heating thermoplastic lid 15. An electromagnetic field is generated by coil 42 along the upstream portions of the pathway which induce a current flow through the can body for heating. The fusing ring portion is then melted through direct conductive contact with the heated flange of the can body. Induction coil 42 is preferably provided by a 50 KW coil generating a electromagnetic field of 30 KHZ which is well known in the field and does not constitute a novel feature of the present invention.

In accordance with the present invention, individual spring suspension mechanisms 43 are mounted to frame 33 and provide moving support to each support shoe 35 as they individually move along the pathway. Further, the plurality of individual support shoes 35 extend in a side-by-side relation along the pathway and cooperate to form first surface 36 (FIGS. 7 and 11). Each shoe 35 is relatively rigid so as to support the weight of the plurality of can bodies 21 transported therealong. Further, these shoes are sufficiently rigid to support can body 21 without substantially deflecting or bending the shoe and to further enable individual spring suspension mechanisms 43 to exert a constant fusing pressure between the can body and the thermoplastic lid as they are squeezed between the support shoe first surface and the flight bar second surface.

It will be appreciated that the constant fusing pressure provided by suspension mechanisms 43 acting on first surfaces 36 could also be provided having the support shoes spring loaded along an inside portion thereof, or by providing a support shoe which is caused to deflect under load to exerts the appropriate constant fusing pressure between the can/lid combination.

In the preferred embodiment, similar to first conveyor assembly 34, second support surface 36 of second conveyor assembly 37 is also provided by a plurality of individual flight bars 44 (FIGS. 7-10) extending transverse to the pathway in a side-by-side relation which cooperate to form the second support surface. Each flight bar 44 is also sufficiently rigid to support the can/lid combination without substantial deflection or bending of the flight bar to enable individual spring suspension mechanisms 43 to exert the constant fusing pressure on the can/lid combination. Synchronizing mechanism aligns one flight bar with one support shoe so that the corresponding first and second surfaces thereof pass through the pathway together in synchronization (FIG. 7). Further, a timing screw (not shown) assures that the can bodies are centered directly between one support shoe and the corresponding flight bar for full support thereon.

Each support shoe 35 and each flight bar 44 is preferably provided by high strength epoxy laminated fiberglass flights which, due to their lack of conductivity, are particularly suitable for passing through the electromagnetic field generated by the induction heating coil without being adversely affected or influenced. In the preferred form, each support shoe 35 is approximately dimensioned as follows: 3.0" L×7.0" W×0.375" T; and each flight bar 44 is approximately dimensioned as follows: 3.0" L×7.0" W×0.25" T. While these dimensions may vary without departing from the true spirit and nature of the present invention, the thickness of the upper flight bars 44 must be sufficiently thick to provide the above-mentioned support while being sufficiently thin to enable the induction heating coil 42 to induce a current on can body 21.

It will further appreciated that while the pathway defined between the opposing first and second conveyor assemblies is preferably substantially linear, non-linear pathways may be defined therebetween without departing from the invention as long as the speed of passage of the first conveyor first surface 36 with the second conveyor second surface 40, while carrying the can/lid combination, is the substantially the same.

As best viewed in FIGS. 7–11, each support shoe 35 and each flight bar includes a pair of spaced-apart roller mechanisms 45, 45' and 46, 46', respectively, which provide rolling support to the corresponding support shoe 35 as it travels over spring suspension mechanisms 43 (FIGS. 7 and 11), and to the corresponding flight bar 44 as it travels over elongated frame 33 (FIG. 10) during passage through the pathway. Each roller mechanism is preferably rotatably mounted at opposing transverse ends of the respective support shoe and flight bar through mounting brackets 47, 47' and 50, 50', as shown in FIGS. 8 and 10, respectively.

A first drive mechanism 51 is coupled to each support shoe 35 of the first conveyor assembly for propelling the plurality of shoes 35 along the pathway as a unit. FIGS. 7, 8 and 11 illustrate that first drive mechanism 51 is preferably provided by a pair of spaced-apart chain drives 52, 52' integrally supporting first roller mechanism 45, 45' therewith. These "load-bearing" roller chains, well known in the field, provide rolling support to each support shoe against the contacting spring suspension mechanism 43. Each link of roller chain drives 52, 52' includes an individual roller member 53, 53' of first roller mechanism 45, 45' rotatably mounted about a linkage axis 54, 54' which individual linkage pivot about. Accordingly, as individual suspension mechanisms 43 in contact with corresponding first roller mechanisms 45, 45' reciprocate, roller chain drives 52, 52' will pivot about respective linkage axes 54, 54' (FIG. 8) to reciprocate the corresponding support shoes 35 for a suspension affect.

A second drive mechanism 55 is coupled to each flight bar 44 of the second conveyor assembly for propelling the plurality of flight bars 44 along the pathway as a unit (FIGS. 9 and 10). Similar to the first drive mechanism, second drive mechanism 55 is preferably provided by a pair of spaced-apart "load-bearing" roller chain drives 56, 56' having second roller mechanisms 46, 46' integrally formed therewith. Hence, these roller chains provide both rolling support to each flight bar 44 and drive the flight bars through the pathway as a unit.

As viewed in FIG. 9, both the first and the second roller chain drive mechanisms are engaged by drive sprockets 57, 58, respectively, which propel corresponding support shoes 35 and flight bars 44 through the pathway. This chain/sprocket arrangement prevents slippage of both first conveyor first surface 36 and second conveyor second surface 40, even when a full plurality of cans are being transported and pressed between the conveyors. Moreover, FIG. 9 illustrates that synchronism mechanism 41 is mechanically provided by a synchronizing chain 60 operably coupled between the drive sprockets 57 and 58 which synchronize the speed of passage of the first surface with the second surface through the pathway.

In accordance with the present invention, the support shoes are individually movably suspended on individual suspension mechanisms 43 by spaced-apart first roller mechanisms 45, 45'. Each spring suspension mechanism 43 includes a pair of individual spaced-apart presser shoes 61, 61' each having an upward facing roller surface 62, 62' positioned to engage and provide rolling support to corresponding first roller mechanisms 45, 45' as they pass thereby. Hence, the side-by-side presser shoes cooperate to guide the supports hoes along the pathway and to bias the support shoe towards the flight bars to induce the constant fusing pressure between the can body and the lid as the two pass through the pathway as a unit.

Each presser shoe 61, 61' is preferably composed of a material, such as DELRIN (linear polyoxymethylene acetal resin), sufficiently durable to transmit the biasing forces of the corresponding suspension mechanism without excessive wear due to continuous contact with the roller mechanisms. Further, DELRIN is not adversely affected by the induction heating coil. FIG. 7 further illustrates that each roller surface 62, 62' of pressure shoe 61, 61' forms a ramp portion 63, 63' which facilitates rolling engagement as the first roller mechanisms 45, 45' pass from one suspension mechanism 43 to another.

While lower support shoes 35 are movably suspended on suspension mechanisms 43, upper flight bars 44 preferably pass through the pathway in a manner providing stability for the can/lid combination to be urged thereagainst. FIG. 10 illustrates that upper second conveyor assembly 37 includes a longitudinally extending guide track assembly 64, 64' formed to guide and support the plurality of flight bars 44 as they pass through the pathway. Each guide track assembly 64, 64' provides C-shaped channels 65, 65' having a lower guide track 66, 66' and an opposing upper guide track 67, 67' which cooperate to receive respective second roller mechanisms 46, 46' therebetween as they travel through the pathway. A small tolerance between roller members 70, 70' of second roller mechanisms 46, 46' and corresponding C-shaped channels 65, 65' permits rolling support of flight bars 44 on the lower guide tracks 66, 66' when the can/lid combination is not carried therebetween, while permitting rolling support of flight bars 44 on the upper guide tracks 67, 67' when the can/lid combination is urged against the flight bars by suspension mechanisms 43 (FIG. 10). Hence, upper guide tracks 67, 67' prevent substantial vertical displacement of the flight bars when the suspension mechanisms urge the can/lid combination thereagainst.

Both the upper guide tracks 67, 67' and lower guide tracks 66, 66' are mounted to elongated frame 33, and are preferably composed of epoxy fiberglass which is not adversely affected or influenced by induction coil. Upper guide tracks 67, 67' may include DELRIN (linear polyoxymethylene acetal resin) wear strips (not shown) positioned to contact the corresponding second roller mechanisms as they pass thereby.

It is conceivable, however, that both the first conveyor assembly and the second conveyor assembly may include opposing suspension mechanisms which cooperate to provide the desired constant fusing pressure between the opposing first and second surfaces without departing from the true spirit and nature of the present invention. Preferably, this constant fusing pressure is provided by a constant fusing force of between about 20 lbs. to about 50 lbs., generated by spring suspension mechanisms 43, which depends primarily on the induction coil output and on the composition of the plastic lid.

For the ease of description and since the opposing sides of suspension mechanisms 43 are the mirror image of one another, only one side thereof will be described in detail. As best viewed in FIGS. 7 and 8, each presser shoe 61 of suspension mechanism 43 is reciprocally supported by at least one, but preferably two, piston rod 71 having an upper end mounted to presser shoe 61 and a lower end mounted for sliding movement to elongated frame 33. Frame 33 includes a horizontally extending lower suspension frame member 72 and a vertically spaced-apart upper suspension frame member 73, each extending longitudinally along frame 33. Each suspension frame includes a set of guide bushings 74, 75, respectively, formed for slidable receipt and guidance of each piston rod 71. Depending upon the height of can body between the opposing conveyors, presser shoes 61, 61' will locally reciprocate in the direction of travel of the piston rods as the respective roller mechanisms 45, 45' of support shoes 35 come into contact therewith. Accordingly, a consistent heal seat is formed regardless of can height.

Disposed between upper frame member 73 and lower frame member 72 is a suspension spring biasing mechanism 76 having one end contacting elongated frame 33, and an opposite end coupled to presser shoe 61 for biasing the can body and the seated thermoplastic lid against second conveyor second surface 40 to provide the constant fusing pressure. Preferably, biasing mechanism 76 is provided by a compression spring 76 concentrically situated around piston rod 71 between the upper suspension frame member and the lower suspension frame member. A seating pin 80 extends through piston rod 71 which limits the reciprocating movement of the piston rod, and hence presser shoe 61, between the upper and lower suspension frame members. Pin 80 further acts as a seating support for the upper end of compression spring 76 to bias the presser shoes toward the second conveyor support surface. To provide this constant fusing pressure, regardless of spring displacement, the compression springs may have variable spring constants (K) which change according to the compression distance (x) to substantially maintain a predetermined constant force.

As above-indicated for this embodiment, the plurality of individual spring suspension mechanisms 43 must be sufficient in number, relative the synchronized conveyor speed, to hold the lid against the can open end for the duration allowing melting and thermal fusion of the lid to the can open end while maintaining a constant pressure therebetween regardless of can body height. This duration is not only especially important during heating of the can body and melting of the thermoplastic fusing ring, but also includes the fusing of the ring to the can body flange 18 and the curing of the lid thereafter. Accordingly, as the can/lid combination passes through certain portions of the pathway (i.e., heating, fusing or curing) the pressure between the can and the lid is constant for all can/lids passing through that particular portion of the pathway even should the can heights vary. For instance, the heating/melting portion of the pathway may maintain a constant fusing pressure, provided by 45 lbs. of constant force force, for all can/lids, while the curing portion of the pathway may maintain a constant fusing pressure, provided by 10 lbs. of constant fusing force, for all can/lids passing therethrough. Hence, a minimum constant fusing pressure is always maintained and provided between the can and the lid during the entire fusing process, so as to enhance the heat seal integrity even with variation in can body height with adjacent can bodies.

This sufficient number of suspension mechanisms 43 is also dependent on the length of the induction heating coil 42 extending longitudinally along the upstream portion of the pathway. The necessary length of the coil is a function of the power output of the coil and the relative synchronized speed of passage between the conveyors. In general, the slower the speed of passage, which has a smaller can per minute output, the shorter the length of the coil. Conversely, the greater the speed of passage, which has a greater can per minute output, the longer the length of the coil must be to allow a sufficient time to heat the can body. Further, the greater the power output of the coil, the faster the heating of the can body. A greater power output, however, adversely heats the other surrounding metallic components of the lid sealing apparatus. Moreover, after the can body has been heated to a sufficient degree to properly melt the fusing ring portion, the pathway must be sufficiently long to allow fusing and curing of the flange to the thermoplastic lid while maintaining the constant fusing pressure therebetween. For example, a 10 foot induction coil allows sufficient time for heating the can bodies at a rate of 400 cans per minute. The downstream cooling or curing section of the pathway is approximately the same length as the heating section. However, the lower first conveyor first surface is preferably longer than the second conveyor second surface 40 to permit inspection of the can/lid combination both before entering the sealing apparatus 30, and upon exiting the apparatus (FIGS. 5 and 6).

In the preferred embodiment of the present invention and as shown in FIGS. 10 and 11, a high pressure roller bump device, generally designated 81, is operably coupled to at least one of the first conveyor assembly and the second conveyor assembly for causing a substantially constant high pressure between the lid and the can open end substantially greater than the constant fusing pressure applied by the suspension mechanisms. This increased high pressure substantially improves fusing adhesion between the components. While more than one consecutive pressure bump devices may be provided to improve fusing adhesion, preferably only one device is aligned along the pathway (FIGS. 5 and 6). This pressure bump device 81 is located at a position along a portion of the pathway where the can/lid combination has been sufficiently heated to melt and fuse the lid to the can open end. Hence, it is preferably positioned just downstream from the end of the induction heating coil 42.

The present invention provides an improved pressure bump device 81 which will increase the fusing force, causing the fusing pressure between the can body and the thermoplastic lid, to as high as about 250 lbs. to about 300 lbs. without causing excessive roller chain wear or damage to the can. The desired optimum increase in force, and hence fusing pressure, from at least 50 lbs. depends upon the type of plastic used in the fusing ring portion, and the power and type of induction coil employed. The high fusing pressure, caused by the high fusing force in excess of about 50 lbs. to about 300 lbs., could have been transferred to the can/lid combination through the presser shoes 61, 61' and the roller chains. However, the chain life would be substantially reduced and the fiberglass flight bars would have to be considerably thicker to prevent deflection. Thicker flight bars would require greater power induction heating coils which would also affect the all the metallic components surrounding the pathway.

Accordingly, pressure bump device 81 includes a pair of pressure roller pads 82, 83 mounted in opposed relation relative one another to frame 33. As shown in FIG. 10, a stationary upper roller pad 82 is mounted to cross-member 84 of frame 33 just above the flight bars 44 of second conveyor assembly 37, while a lower roller pad 83 is movably mounted to frame 33 just below support shoes 35 of first conveyor assembly 34. Together, the opposed roller pads contact the respective flight bars and support shoes to substantially increase the fusing pressure acting on the can/lid combination as it passes through that portion of the pathway.

Lower roller pad 83 is movably mounted to a high pressure biasing mechanism 84 having a central diaphragm-type piston rod 85 extending therefrom with one end mounted to lower roller pad 83 while an opposite end is movably mounted to the biasing mechanism for biasing the lower roller pad 83 toward the opposing upper roller pad 82. FIGS. 10 and 11 illustrate that pressure bump device 81 includes four guide rods 86 radially spaced from central piston rod 85 each extending downwardly from lower roller pad 83 toward biasing mechanism 84. These guide rods cooperate to provide lateral support and reciprocating guidance to lower roller pad 83 as the can/lid combinations pass thereover. A transverse mounting frame 87 of elongated frame 33 provides support to biasing mechanism 84, and includes a support plate 90 having bushings 91 slidably receiving guide rods 86 for vertical displacement thereof. Support plate 90 provides a receiving aperture 92 extending therethrough for slidably receiving central piston rod 85. Accordingly, high pressure bump device 81 provides a substantially increased fusing pressure zone which compensates for variations in can body height for a substantially constant high fusing pressure.

Both lower roller pad 83 and upper roller pad 82 (not shown in FIG. 11) are preferably provided by a plurality of offset roller wheels 93 in rolling contact with the backside of the support shoes 35 and the backside of the flight bars 44, respectively. These roller pads 82 and 83 provide an increased region of high pressure which uniformly distributes the load to the support shoes and the flight bars as the can/lid combination passes through this high pressure portion of the pathway. Hence, a very high pressure area is created without causing deflection of the support shoes or excessive wear of the roller chains.

In the preferred embodiment, biasing mechanism 84 is provided by an adjustable air cylinder capable of providing up to 300 lbs. of constant high fusing force between the roller pads 82 and 83 which enhances adhesion of the can flange 18 to the fusing ring substantially increasing burst pressure. It will be understood that the biasing mechanism could also be provided by a compression spring or the like without departing from the true spirit and nature of the present invention.

In the preferred form, each flight bar 44 includes a heat insulative pad 94 (FIGS. 8 and 10) mounted to the second surfaces 40 thereof at a contact region between the second surface and the can/lid combination. Insulative pads 94 are generally square or rectangular shaped and are incorporated to insulate flight bars 44 from direct contact with the flange 18 of can body 21' should the capping machine malfunction and fail to provide a thermoplastic lid thereatop. Accordingly, in this situation, during induction heating of the can body, the flange portion will not burn the epoxy fiberglass flight bars. Insulative pads 94 are preferably composed of an industrial ceramic such as Alumina (Aluminum Oxide).

Once support shoes 35 have passed through the pathway, first conveyor assembly 34 returns the shoes along lower return tracks 95, 95' moving in a direction opposite the support shoes in the pathway (FIG. 8). Lower return tracks 95, 95' are provided by spaced-apart L-shaped tracks mounted to elongated frame 33 and formed to provide rolling support to first roller mechanisms 45, 45' as the support shoes travel thereby. Each return track 95, 95' preferably includes a DELRIN (linear polyoxymethylene acetal resin) wear strip 96, 96' positioned to provide rolling support for the roller mechanisms thereon.

Similarly, once flight bars 44 have passed through the pathway, second conveyor assembly 37 returns the flight bars along upper return tracks (not shown but similar to the first conveyor lower return tracks 95, 95') moving in a direction opposite the flight bars in the pathway. These upper return tracks are preferably provided by spaced-apart L-shaped tracks mounted to elongated frame 33 and formed to provide rolling support to second roller mechanisms 46, 46'. DELRIN wear strips may also be provided as well.

Further, portions of elongated frame 33, such as crossmembers 84, may be formed of high strength fiberglass. Hence, the induction heating coil power output may be increased without adversely affecting these portions of the elongated frame.

Turning now to FIGS. 12–16, the rotary-type conveyor alternative embodiment of thermoplastic lid sealing apparatus 30' is illustrated. Briefly, in the rotary embodiment, lid sealing apparatus 30' includes a frame 33', and a first rotary conveyor assembly 34' including a lower turret base plate 100' rotatably mounted to frame 33' about rotating axis 101' (FIG. 13). A plurality of independent support shoes 35' are slidably mounted to lower plate 100' for reciprocating movement in the direction of axis 101'. Further, support shoes 35' are circumferentially positioned in a side-by-side relation about axis 101' which collectively cooperate to define a segmented circular first surface 36' for supporting and moving the cans 21' along a circular pathway. A second rotary conveyor assembly 37' includes an upper turret base plate 102' rotatably mounted to frame 33' about axis 101', and is positioned adjacent to first conveyor assembly 34'. Second conveyor assembly 37' includes a relatively rigid circular second surface 40' in opposed relation to segmented first surface 36' for further transport of cans 21' between the first and second conveyor assemblies 34', 37', respectively, along the circular pathway. A heating element 42' is positioned along a portion of one of the first surface 36' and the second surface 40', and is formed to heat the can bodies for thermal fusion of lid 15' to the can open end 20'. A plurality of individual spring suspension mechanisms 43' are operably coupled between respective support shoes 35' and lower plate 100' for individually biasing segmented first surface 36' of first conveyor assembly 34' toward second surface 40' of second conveyor assembly 37' to provide a substantially constant fusing pressure between the can open end 20' and the lid 15' as the two travel as a unit proximate heating element 42'. The constant fusing pressure must be sufficient in duration relative to the conveyor speed to hold lid 15' against can open end 20' to allow melting and thermal fusion of the lid to the can open end.

FIG. 12 illustrates that the cans preferably travel around a circular path at the perimeter of the assembly. The cans enter and exit rotary lid sealing apparatus through entrance and exit conveyors 103', 104', respectively, which transport the can/lid combination to and from the apparatus. At entrance conveyor 103', a timing screw 105' aligns and spaces the cans for engagement with an entrance star wheel 106' which in turn spaces and synchronizes each can/lid combination for transport from the entrance conveyor to the rotary lid sealing apparatus. Similarly, after fusion of the lid to the can and subsequent cooling, an exit star wheel 107' spaces and transports the can/lid combination from the lid sealing apparatus to the exit conveyor.

Both the upper base plate 102' and lower base plate 100' are rotatably mounted about axis 101' to common shaft 110' which is rotatably supported by frame 33'. A spacer 111' (FIG. 13) is positioned between the upper base plate and the lower base plate which spaces the two apart by a distance sufficient to retain the can/lid combination therebetween.

As best viewed in FIGS. 12 and 14, upper base plate 102' provides a plurality of U-shaped pockets 113' circumferentially positioned about axis 101'. Each pocket 113' is formed and dimensioned to receive a midportion of the can bodies therein for moving support and orientation along the pathway. Preferably, upper turret base plate 102' is about 8 feet in diameter and provides 70 pockets, each of which is synchronized with entrance star wheel 106' and exit star wheel for transport and receipt of the can to and from the lid sealing apparatus. Further, an annular cover plate 112' is positioned over each pocket which provides second surface 40'.

As previously mentioned and as best shown in FIGS. 14 and 15, support shoes 35' are circumferentially positioned in a side-by-side relation about axis 101' which collectively cooperate to define a segmented circular first surface 36' for supporting and moving the cans 21' along the circular pathway. Each support shoe 35' is preferably U-shaped, similar to pockets 113', and includes a U-shaped lip portion 114' extending upwardly from first surface 36'. Lip portion 114' is formed to receive and retain the opposite end of can body 21' atop and supported by shoes 35' as the can is moved from the entrance star wheel to the support shoe.

Each support shoe 35' is mounted to a sliding shaft, generally designated 115', which is slidably supported by lower turret base plate 100'. As illustrated in FIG. 14, sliding shaft 115' cooperates with a bearing 116' for sliding support in the direction longitudinally along shaft 115' and along axis 101'. Collectively, bearings 116' are positioned circumferentially around lower turret base plate 100' along the circular pathway, and each is formed for sliding receipt of the corresponding sliding shaft 115'.

An opposite end of each sliding shaft 115' includes a cam mechanism 117' formed for rolling support on a cam track 120' extending in a direction along the pathway. Cam track 120' is mounted to frame 33' (not shown) and is formed to cause the can/lid combination to move into abutting relation, via cam mechanism 117', against second surface 40' of cover plate 112'. Cam mechanism 117' includes a pair of opposing rollers 121', 122' mounted to sliding shaft 115' which are positioned on opposite sides of cam track 120'. Accordingly, depending on the vertical displacing path of cam track 120' (FIG. 15), as rollers 121', 122' rotatably contact cam track 120' sliding shaft 115' reciprocally moves axially therealong causing support shoe 35', and hence the can/lid combination, to move toward or away from cover plate second surface 40' for abutting contact therewith.

Once an unfused can/lid combination is transported from entrance star wheel 106' into a corresponding support shoe 35', cam mechanism 117' will be in rolling support with an unengaged portion 123' of cam track 120' (FIG. 15). Upon the can/lid combination moving along circular pathway near the induction heating coil 42', cam mechanism 117' ascends a first ramped portion 124' of cam track 120' toward a low pressure engaging portion 125' thereof which gradually moves the lid toward and into contact with second surface 40'. As will be described in greater detail, each suspension mechanism 43' assures that when cam mechanism 117' is engaged with the low pressure engaging portion of the cam track 120', the pressure between can 21' and lid 15' generated between first surface 36' and second surface 40' is maintained at the desirable constant fusing pressure, regardless of can height variations.

Importantly, the low pressure engaging portion 125' of cam track 120' must extend along the circular pathway a sufficient distance, relative to conveyor speed, to hold lid 15' against can open end 20' for a duration allowing melting and thermal fusion of lid to can open end. This distance is also a function of the power output of heating element 42' which is positioned opposite cam track engaging portion 125' just above a portion of annular cover plate 112'. Accordingly, the faster the conveyor speed, the longer the low pressure engaging portion 125' must be at the constant fusing pressure and constant output of heating element 42'. In contrast, the slower the conveyor speed, the shorter the cam track engaging portion must be. Preferably, however, the heating element and the low pressure engaging portion of the cam track each extend about at least one-third of the circular pathway (FIG. 12).

Since the upward vertical displacement of the cam track between the low pressure engaging portion 125' and the unengaged portion 123' of cam track 120' is preferably a fixed distance, each suspension mechanism 43' must move support shoe 35' relative the corresponding cam mechanism 117' to compensate for variations in can height. Hence, by providing this adjustment, the required constant low fusing pressure between the can open end and the lid can be maintained, as they move along the cam track engaging portion. FIG. 15 illustrates that sliding shaft 115' is provided by a first or tubular shaft 126' mounted to corresponding support shoe 35', and a second or cam follower shaft 127' mounted to cam mechanism 117'. Tubular shaft 126' and cam follower shaft 127' are in axially alignment, and are formed to slidably cooperate relative one another for movement of tubular shaft 126' between an extended position (sliding shaft 115' in FIG. 15) and a retracted position (sliding shaft 115' in FIG. 15).

Tubular shaft 126' forms a bore 130' dimensioned for axial sliding receipt of cam follower shaft 127' therein. An upper distal end of cam follower shaft 127' provides a recess 131' formed for receipt of a constant tension spring biasing device 132' for biasing the tubular shaft toward the extended position. Preferably, biasing device 132' includes a low pressure compression spring 133' having one end seated in recess 131' and an opposite end seated against an end of bore 130'. To provide this constant low fusing pressure, regardless of spring displacement, the low pressure springs may have variable spring constants (K) which change according to the compression distance (x) to substantially maintain a predetermined constant pressure. Low pressure spring 133' thus provides the constant low fusing pressure between can 21' and seated lid 15' as the lid abuts against second surface 40' of cover plate 112' in the low pressure engaging portion of cam track 120'.

In accordance with the present invention, when a particular support shoe 35' and corresponding sliding shaft 115' are positioned in unengaged portion of cam track 120' (sliding shaft 115' in FIG. 15), tubular shaft 126' is in the extended position, relative cam follower shaft 127', and support shoe 35' is retained or supported atop lower turret base plate 100'. As rollers 121', 122' of cam mechanism 117' rollingly contact first ramped portion 124' of cam track 120' to urge cam follower shaft 127' upwardly, compression spring 133' in turn urges tubular shaft upwardly pushing support shoe 35' toward cover plate 112'. Thus, tubular shaft 126' slides axially along bearing 116' until lid 15' seats against second surface 40'. Once cam mechanism 117' further vertically displaces cam follower shaft 127' upon rolling onto the low pressure engaging portion of cam track 120', tubular shaft 126' slidably receives cam follower shaft 127' in bore 130' and moves toward the retracted position (sliding shaft 115''' in FIG. 15). Low compression spring 133' is then depressed by an amount proportional to the can body height which retains the can against the lid at the constant fusing pressure. Importantly, as mentioned, the sliding shaft and support shoe remain in the low pressure engaging portion of cam track 120', and under heating element 42', so that the constant fusing pressure is sufficient in duration relative to the conveyor speed to allow melting and thermal fusion of the lid to the can open end.

It will be appreciated that most of the components of the rotary-type lid sealing apparatus 30' which are subjected to the magnetic field of the induction heating coil 42' are comprised of non-metallic or non-magnetic materials. For instance, cover plate 112', and upper and lower turret base plates 102', 100', respectively, are preferably composed of fiberglass or epoxy laminated fiberglass. Support shoes 35' may be provided by DELRIN (linear polyoxymethylene acetal resin) or fiberglass, while bearings 116' are composed of a non-metallic material such as a ceramic or the like. Similarly, sliding shafts 115' are composed of a non-magnetic material such as stainless steel.

To guide axial sliding displacement of tubular shaft 126' relative bearing 116', a bearing guide mechanism 134' is positioned between bearing 116' and corresponding sliding shaft 115'. As best viewed in FIG. 14, bearing guide mechanism 134' includes a guide key 135' radially protruding from tubular shaft 126' and a slot 136' formed in bearing 116' which is dimensioned for sliding receipt of guide key 135' therealong. Accordingly, bearing guide mechanism 134' permits axial movement of tubular shaft 126' relative bearing 116' while preventing relative rotational movement therebetween.

Similarly, to guide the axial sliding movement of tubular shaft 126' relative cam follower shaft 127' between the extended position and the retracted position, a shaft guide mechanism 137' is provided which includes a retaining pin 138' (FIG. 15) extending through cam follower shaft 127', and is slidingly received in retaining channels 140' provided by tubular shaft 126'. As tubular shaft 126' and cam follower shaft 127' reciprocate relative one another, the ends of retaining pin 138' slide longitudinally along channel 140' for guided movement therein. Further, retaining pin 138' prevents separation of the tubular shaft from the cam follower shaft 127' when the sliding shaft is situated at the unengaged portion of the cam track.

Referring now to FIGS. 12 and 16, a high pressure roller bump device 141' is provided which is operably coupled to first conveyor assembly 34' and second conveyor assembly 37'. Similar to the linear conveyor-type embodiment, bump device 141' generates a substantially constant high fusing pressure between the lid and the can open end which is substantially greater than the constant low fusing pressure applied by the suspension mechanisms at the low pressure engaging portion of the cam track. This increased high pressure substantially improves fusing adhesion between the components. Again, this pressure bump device 141' is located at a position along a portion of the circular pathway (FIG. 12) where the can/lid combination has been heated for a sufficient duration to melt and fuse the lid to the can open end. Hence, it is preferably positioned just downstream from the end of the induction heating coil 42'.

Each suspension mechanism 43' includes a high pressure compression spring 143' which, when depressed and when in combination with low pressure compression spring 133', provides the substantially constant high fusing pressure between the lid and the can open end. As shown in FIGS. 15 and 16, low pressure spring 133' is preferably concentrically positioned inside high pressure spring 143', and is dimensioned to have an untensioned height ($H_1$) greater than an untensioned height ($H_2$) of high pressure spring 143'. Therefore, when sliding shaft 115' is positioned along low pressure engaging portion 125' of the cam track, high pressure compression spring 143' is free of engagement between tubular shaft 126' and cam follower shaft 127' so that the constant low fusing pressure provided by low pressure spring 133' is uninfluenced by high pressure spring 143'.

To engage and depress high pressure spring 143' to provide the constant high fusing pressure, cam track 120' includes a second ramped portion 144' (FIG. 16) which vertically displaces cam follower shaft 127' upwardly toward a high pressure engaging portion 145' thereof, via cam mechanism 117'. Upon each cam mechanism 117' moving towards high pressure engaging portion 145', cam follower shaft 127' slides axially relative tubular shaft 126' (the retracted position) by an amount sufficient to depress high pressure spring 143' to induce the constant high fusing pressure between first conveyor first surface 36' and second conveyor second surface 40'. It will be understood, of course, that both the low pressure spring 133' and the high pressure spring 143' collectively provide the constant high fusing pressure between the lid and the can.

To reduce vertical deflection of second surface 40' of cover plate 112' as the can/lid combination abuts the second surface at the constant high fusing pressure, roller bump device 141' includes a roller pad 142' positioned in rolling contact with an upper surface of cover plate 112' (FIG. 16). Roller pad 142', mounted to frame 33', provides a firm and uniform distribution of rolling support across the pad to substantially prevent upward vertical deflection of cover plate 112'. Accordingly, the length of the high pressure engaging portion of cam track 120' is approximately equivalent to the length of the roller pad 142'. Subsequently, a downward ramped portion (not shown) moves cam mechanism 117' back to the low pressure engaging portion of cam track 120' where the constant low fusing pressure is reapplied between the can and the lid during the cooling down phase of the fusing process (FIG. 12). Subsequently, the fused lids are transported, via exit star wheel 107', from the rotary lid sealing apparatus to exit conveyor 104'.

In another aspect of the present invention, a method of fusing a heat-sealable lid 15 to an open end of a can body 21 is provided using the above-described lid sealing apparatus 30. The method comprises the steps positioning the lid on the can open end 20, placing the can body 21 and lid 15 between first conveyor first surface 36 and second conveyor second surface 40 for transport along said pathway. Next, heating can body 21 along a portion of one of the first surface and the second surface to a temperature sufficient to thermally fuse lid 15 to can open end 20. Finally, holding lid 15 against open end 20 of can body 21 at a substantially constant fusing pressure, regardless of variations in can height, between can open end 20 and lid 15 for a duration allowing melting and thermal fusion of the lid to the can open end as the can and the lid travel as a unit along the pathway between the first and the second conveyor assemblies.

The holding step includes passing can body 21 and lid 15 through a plurality of individual spring suspension mechanisms 43 individually biasing first surface 36 of first conveyor assembly 34 toward second surface 40 of second conveyor assembly 37 to provide the constant fusing pressure. Each said spring suspension mechanism 43 is operably mounted to elongated frame 33, and the plurality of individual spring suspension mechanisms are sufficient in number relative to conveyor speed to hold the lid against the can open end for a duration.

The method may further include the step of synchronizing the speed of passage of first surface 36 with second surface 40 through the pathway while carrying can body 21 between the first and the opposing second surface through a synchronism mechanism 41 operably coupled between the first and second conveyor assemblies.

Further, the method provides a substantially constant high pressure between thermoplastic lid 15 and the can body open end 20 substantially greater than the constant fusing pressure to improve fusing adhesion therebetween upon passage through a pressure bump device. The high pressure bump device operably urging the first conveyor first surface 36 toward the second conveyor second surface 40. The pressure bump device 81 being located at a position along sealing apparatus 30 where the can body has been sufficiently heated to melt and fuse thermoplastic lid 15 to the can open end.

What is claimed is:

1. A lid sealing apparatus for sealing a heat-sealable lid to a metallic can having an open end upon which said lid is to be fused and an opposite end, said sealing apparatus comprising:

a frame;

a first conveyor assembly coupled to said frame and including a plurality of independent support shoes mounted in a side-by-side relation which collectively cooperate to define a segmented first surface for supporting and moving said can along a pathway;

a second conveyor assembly coupled to said frame adjacent to said first conveyor assembly, said second conveyor assembly including a relatively rigid, induction heat-resistant second surface in opposed moving relation to said first surface for further transport of said can between said first and second conveyor assemblies along said pathway;

an induction heating element positioned along a portion of one of said first surface and said second surface, and formed to thermally fuse said lid to said can open end by inducing a current in the metallic can for heating thereof; and a plurality of individual spring suspension mechanisms operably coupled to respective support shoes for individually biasing said first surface of said first conveyor assembly toward said second surface of said second conveyor assembly to provide a substantially constant fusing pressure between said can open end and said lid as the two travel as a unit proximate said heating element, said constant fusing pressure being sufficient in duration relative to conveyor speed to hold said lid against said can open end to allow melting and said thermal fusion of said lid to said can open end.

2. The lid sealing apparatus as defined in claim 1 further including:

a synchronism mechanism operably coupled between said first conveyor assembly and said second conveyor assembly for synchronizing speed of passage of said first surface with said second surface through said pathway while carrying said can between said first surface and the opposing second surface.

3. The lid sealing apparatus as defined in claim 2 wherein, said support shoes are relatively rigid, and said individual spring suspension mechanisms are operably mounted to said frame and provide moving support to each support shoe as it moves along said pathway.

4. The lid sealing apparatus as defined in claim 3 wherein, said plurality of individual spring suspension mechanisms being sufficient in number relative to said conveyor speed to hold said lid against said can open end for said duration allowing said melting and said thermal fusion of said lid to said can open end.

5. The lid sealing apparatus as defined in claim 1 wherein, each said support shoe includes a roller mechanism rotatably mounted thereto for providing rolling support of each shoe as it travels through said pathway.

6. The lid sealing apparatus as defined in claim 5 wherein, said first conveyor mechanism includes a first drive mechanism coupled to each support shoe for propelling said shoes along said pathway as a unit.

7. The lid sealing apparatus as defined in claim 6 wherein, each said support shoe includes said roller mechanisms rotatably mounted at opposing transverse ends thereof to provide rolling support of each shoe as it travels over said spring suspension mechanisms during passage through said pathway.

8. The lid sealing apparatus as defined in claim 7 wherein, said first drive mechanism comprises a pair of spaced roller chains mounted to said opposing transverse ends of said shoes, each chain operably carrying a respective roller mechanism thereon.

9. The lid sealing apparatus as defined in claim 8 wherein, each spring suspension mechanism includes a pair of individual spaced-apart presser shoes each having a roller surface positioned to engage and provide said rolling support to said corresponding roller mechanism, each independent pair of presser shoes cooperating with adjacent pairs of presser shoes to form said pathway.

10. The lid sealing apparatus as defined in claim 9 wherein, each said spring suspension mechanism further includes a spring biasing mechanism disposed between said frame and each said presser shoe for biasing said can and said seated lid against said second conveyor second surface to provide said constant fusing pressure.

11. The lid sealing apparatus as defined in claim 10 wherein, each said spring suspension mechanism further includes at least one piston rod having one end mounted to said presser shoe and an opposite end slidably cooperating with said frame for reciprocating movement of said presser shoe toward and away from said second conveyor second surface.

12. The lid sealing apparatus as defined in claim 11 wherein, said can opposite end is seated against said first conveyor first surface, and said can open end, said lid and said heating element are positioned proximate said second conveyor second surface.

13. The lid sealing apparatus as defined in claim 6 herein, said second conveyor assembly includes a plurality of independent transversely mounted side-by-side relatively rigid flight bars cooperating to define said second surface.

14. The lid sealing apparatus as defined in claim 13 wherein, each said flight bar includes a roller mechanism rotatably mounted at opposing transverse ends thereof to provide rolling support of each flight as it travels over a spaced-apart guide brackets of said frame during passage through said pathway.

15. The lid sealing apparatus as defined in claim 14 wherein, said second conveyor mechanism includes a second drive mechanism coupled to each flight for propelling said flight bars along said pathway as a unit.

16. The lid sealing apparatus as defined in claim 15 wherein, said second drive mechanism comprises a pair of spaced roller chains mounted to said opposing transverse ends of said flight bars, each chain operably carrying a respective roller mechanism thereon, and further including a synchronism mechanism operably coupled between said first drive mechanism and said second drive mechanism for synchronizing said speed of passage of said first surface with said second surface through said pathway while carrying said can therebetween.

17. The lid sealing apparatus as defined in claim 16 wherein, said induction heating element is provided by an induction heating coil positioned proximate said second conveyor second surface, and said flight bars are composed of an induction heat-resistant fiberglass.

18. The lid sealing apparatus as defined in claim 17 wherein, said heat-resistant fiberglass is provided by high-strength epoxy laminated fiberglass.

19. The lid sealing apparatus as defined in claim 17 wherein, said flight bars are relatively thick enough to provide said rigidity without bending when subject to said constant fusing pressure, and are relatively thin enough to permit said induction coil to induce said current.

20. The lid sealing apparatus as defined in claim 17 wherein, each flight bar includes a heat insulative pad mounted to said second surface at a contact region between said second surface and said can.

21. The lid sealing apparatus as defined in claim 20 wherein, said insulative pads are comprised of an industrial ceramic.

22. The lid sealing apparatus as defined in claim 1 wherein, each said spring suspension mechanism includes:
a moving support surface providing said moving support to said support shoes,
at least two piston rods each having one end mounted to said moving support surface and an opposite end slidably cooperating with said frame for reciprocating movement of said moving support surface toward and away from said second conveyor second surface, and
a spring biasing mechanism disposed between said frame and each said moving support surface for biasing said can and said seated lid against said second conveyor second surface.

23. The lid sealing apparatus as defined in claim 22 wherein, each said support shoe includes a roller mechanism rotatably mounted thereto to provide rolling support of each shoe as it travels over said spring suspension mechanism moving support surface during passage through said pathway.

24. The lid sealing apparatus as defined in claim 3 wherein, said second conveyor assembly includes a plurality of independent transversely mounted side-by-side relatively rigid flight bars cooperating to define said second surface.

25. The lid sealing apparatus as defined in claim 3 wherein, said heating element is provided by an induction heating coil positioned proximate said second conveyor second surface.

26. The lid sealing apparatus as defined in claim 3 further including:

at least one pressure bump device operably coupled to at least one of said first conveyor assembly and said second conveyor assembly causing a substantially constant high pressure between said lid and said can open end substantially greater than said constant fusing pressure caused by said suspension mechanisms to improve fusing adhesion therebetween, said bump device being located at a position along said pathway where said can has been sufficiently heated to melt and fuse said lid to said can open end.

27. The lid sealing apparatus as defined in claim 26 wherein, said pressure bump device includes a high pressure piston having a piston rod with one end providing moving support to one of each respective support shoe and a respective portion of said second surface passing therethrough and an opposite end slidably cooperating with said frame for reciprocating movement of said one of each respective support shoe and the respective portion of said second surface toward and the away from said second conveyor second surface, and a bump biasing device operably coupled to said piston rod for biasing said rod one end toward one of said second surface and said first surface, respectively, to provide said constant high pressure.

28. The lid sealing apparatus as defined in claim 27 wherein, said piston rod one end includes a first roller pad assembly in rolling contact with said one of each respective shoe and said respective portion of said second surface to provide rolling support therewith as it passes thereby.

29. The lid sealing apparatus as defined in claim 28 wherein, said first roller pad assembly includes a plurality of rows of off-set roller members aligned to rotate in the direction of travel of said pathway.

30. The lid sealing apparatus as defined in claim 28 wherein, said pressure bump device includes a second roller pad assembly mounted to said frame opposing said first roller pad assembly, and in rolling contact with the other one of a respective portion of said second surface and each respective shoe as it passes therethrough.

31. The lid sealing apparatus as defined in claim 30 wherein, each said first roller pad assembly and said second roller pad assembly includes a plurality of rows of off-set roller members aligned to rotate in the direction of travel of said pathway.

32. The lid sealing apparatus as defined in claim 30 wherein, said first roller pad assembly is in rolling contact with each respective support shoe, and said second roller pad assembly is in rolling contact with said respective portion of said second surface.

33. The lid sealing apparatus as defined in claim 26 wherein, said constant fusing pressure is provided by a constant fusing force between about 20 lbs. to about 50 lbs. and said constant high pressure is provided by a constant high fusing force greater than about 50 lbs.

34. The lid sealing apparatus as defined in claim 27 wherein, said biasing device comprises an air cylinder.

35. The lid sealing apparatus as defined in claim 27 wherein, said biasing device comprises a spring member.

36. The lid sealing apparatus as defined in claim 6 wherein, said first conveyor and said second conveyor are substantially linear.

37. The lid sealing apparatus as defined in claim 1 wherein, said first conveyor assembly includes a base plate movably mounted to said frame for movement along said pathway, and a plurality of bearings mounted to said base plate, each said bearing corresponding to one spring suspension mechanism; and
each said suspension mechanism including a sliding shaft slidably coupled to said corresponding bearing, one end of said sliding shaft mounted to a corresponding support shoe and an opposite end thereof movably mounted to said frame to produce sliding movement of said corresponding support shoe first surface toward said second surface of said second conveyor assembly.

38. The lid sealing apparatus as defined in claim 37 wherein, said frame includes a cam track extending in the direction of said pathway, and
each shaft opposite end includes a cam mechanism movably mounted to said cam track for providing moving support of said corresponding support shoe as it travels along said pathway, said cam track having a first engaging portion formed to cause said sliding shaft and said support shoe to move toward the second surface of said second conveyor upon engagement of said cam mechanism therewith to provide said constant fusing pressure as the respective sliding shaft, support shoe and suspension mechanism move along said pathway as a unit.

39. The lid sealing apparatus as defined in claim 38 wherein, each said cam mechanism includes a pair of opposing rollers rotatably mounted to said cam track to provide rolling support of said sliding shaft and said support shoe as they move along said pathway.

40. The lid sealing apparatus as defined in claim 38 wherein, each sliding shaft of said suspension mechanism includes a first shaft mounted to said corresponding support shoe and a second shaft movably mounted to said cam mechanism, said first shaft and said second shaft being axially aligned and formed to slidably cooperate for movement of said first shaft between a retracted position and an extended position, and each said suspension mechanism further includes a constant tension spring biasing device coupled between said first shaft and said second shaft for biasing said first shaft toward said extended position, and providing said constant fusing pressure between said can and said seated lid as said lid abuts against said second conveyor second surface upon said cam mechanism engaging said first engaging portion of said cam track which urges said first shaft toward said retracted position.

41. The lid sealing apparatus as defined in claim 40 wherein, said second shaft is a cam follower shaft, said first shaft is a tube shaft defining a bore formed and dimensioned for sliding receipt of said second shaft therein, and said biasing device includes a compression spring operably positioned in said shaft bore having one end contacting said first shaft and an opposite end contacting said second shaft.

42. The lid sealing apparatus as defined in claim 41 wherein, each said suspension mechanism includes a shaft guide mechanism positioned between said first shaft and said second shaft to guide longitudinal sliding movement therebetween.

43. The lid sealing apparatus as defined in claim 42 wherein, each first shaft is in sliding contact with each corresponding bearing.

44. The lid sealing apparatus as defined in claim 43 further including:

a bearing guide mechanism positioned between each bearing and each corresponding first shaft to guide longitudinal sliding movement therebetween.

45. The lid sealing apparatus as defined in claim 40 wherein, said first conveyor and said second conveyor are rotary conveyors, and said pathway is circular.

46. The lid sealing apparatus as defined in claim 45 further including:

a synchronism mechanism operably coupled between said first conveyor assembly and said second conveyor assembly for synchronizing speed of passage of said segmented first surface with said second surface through said pathway while carrying said can between said first surface and the opposing second surface.

47. The lid sealing apparatus as defined in claim 46 wherein, said heating element is provided by an induction heating coil positioned proximate said second conveyor second surface to induce a current in the can for heating thereof.

48. The lid sealing apparatus as defined in claim 40 wherein, each said biasing device includes a low pressure compression spring and a high pressure compression spring, said low pressure compression spring is dimensioned to be depressed between said first shaft and second shaft to provide said constant fusing pressure when said cam mechanism engages said engaging portion of said cam track, while said high pressure compression spring is dimensioned to be free of depression between said first shaft and second shaft uninfluencing said constant fusing pressure when said cam mechanism engages said engaging portion of said cam track, and said cam track includes a second engaging portion formed to further urge said first shaft toward said retracted position until said high pressure compression spring is caused to depress between said first shaft and second shaft to provide a substantially constant high pressure between said lid and said can open end substantially greater than said constant fusing pressure caused by said low pressure compression spring to improve fusing adhesion therebetween.

49. The lid sealing apparatus as defined in claim 48 further including:

a pressure bump device mounted to said frame at a position along said pathway in alignment with said second engaging portion of said cam track, and operably coupled to said second conveyor assembly to provide additional support to said second surface for prevention of deflection thereof as each can passes through the substantially constant high pressure region of said pathway.

50. The lid sealing apparatus as defined in claim 49 wherein, said pressure bump device includes a roller pad assembly mounted to said frame, and in rolling contact with a backside surface of said second conveyor assembly opposite said second surface to substantially prevent deflection of said second surface thereof as the can and lid pass therethrough as a unit.

51. The lid sealing apparatus as defined in claim 37 further including:

a bearing guide mechanism positioned between each said bearing and each corresponding sliding shaft to guide longitudinal sliding movement therebetween.

52. A lid sealing apparatus for sealing a heat-sealable lid to a can having an open end upon which said lid is to be fused and an opposite end, said sealing apparatus comprising:

an elongated frame;

a first conveyor assembly coupled to said frame and including a plurality of independent, transversely mounted side-by-side support shoes of relative rigidity collectively cooperating to define a segmented first surface for supporting and moving said can along a pathway, each said support shoe includes a roller mechanism rotatably mounted at opposing transverse ends thereof to provide rolling support of each shoe as it travels along said pathway;

a second conveyor assembly coupled to said frame and extending along and adjacent to said first conveyor assembly, said second conveyor assembly including a plurality of independent, transversely mounted side-by-side flight bars of relative rigidity cooperating to define a second surface in opposed moving relation to said first surface for further transport and support of said can between said first and second conveyor assemblies along said pathway, each said flight bar includes a roller mechanism rotatably mounted at opposing transverse ends thereof to provide rolling support of each flight as it travels over a spaced-apart guide brackets of said frame during passage through said pathway;

a heating element positioned longitudinally along a portion of one of said first surface and said second surface, and formed to thermally fuse said lid to said can open end; and a plurality of individual spring suspension mechanisms operably mounted to said frame and providing said rolling support to each support shoe roller mechanism as it moves thereover, each spring suspension mechanism individually biasing said first surface of said first conveyor assembly toward said second surface of said second conveyor assembly to provide a substantially constant fusing pressure between said can open end and said lid as the two travel as a unit proximate said heating element, said plurality of individual spring suspension mechanisms being sufficient in number relative to conveyor speed to hold said lid against said can open end for a duration allowing melting and said thermal fusion of said lid to said can open end.

53. The lid sealing apparatus as defined in claim 52 wherein, a synchronism mechanism operably coupled between said first conveyor assembly and said second conveyor assembly for synchronizing speed of passage of said first surface with said second surface through said pathway while carrying said can between said first surface and the opposing second surface.

54. The lid sealing apparatus as defined in claim 53 wherein, each said spring suspension mechanism is formed to reciprocate said first conveyor first surface toward and away from said second conveyor second surface, and each includes a spring biasing mechanism biasing said can and said seated lid against said second conveyor second surface to provide said constant fusing pressure.

55. The lid sealing apparatus as defined in claim 54 further including:

a pressure bump device operably urging one of said first conveyor first surface and said second conveyor second surface toward one of the other of said second surface and said first surface, respectively, for causing a substantially constant high pressure between said lid and said can open end substantially greater than said constant fusing pressure to improve fusing adhesion therebetween, said bump device being located at a position along said sealing apparatus where said can has been sufficiently heated to melt and fuse said lid to said can open end.

56. A rotary lid sealing apparatus for sealing a heat-sealable lid to a metallic can having an open end upon which said lid is to be fused and an opposite end, said sealing apparatus comprising:

a frame;

a first rotary conveyor assembly including a lower turret base plate rotatably mounted to said frame about an axis, and a plurality of independent support shoes slidably mounted to said lower plate for reciprocating movement in the direction of said axis, and circumferentially positioned in a side-by-side relation about said axis which collectively cooperate to define a segmented circular first surface for supporting and moving said can along a circular pathway;

a second rotary conveyor assembly including an upper turret base plate rotatably mounted to said frame about said axis and positioned adjacent to said first conveyor assembly, said second conveyor assembly including a relatively rigid, induction heat-resistant, circular second surface in opposed relation to said segmented first surface for further transport of said can between said first and second conveyor assemblies along said circular pathway;

an induction heating element positioned along a portion of one of said first surface and said second surface, and formed to thermally fuse said lid to said can open end by inducing a current in the metallic can for heating thereof; and a plurality of individual spring suspension mechanisms operably coupled between respective support shoes and said lower plate for individually biasing said segmented first surface of said first conveyor assembly toward said second surface of said second conveyor assembly to provide a substantially constant fusing pressure between said can open end and said lid as the two travel as a unit proximate said heating element, said constant fusing pressure being sufficient in duration relative to conveyor speed to hold said lid against said can open end to allow melting and said thermal fusion of said lid to said can open end.

57. The rotary lid sealing apparatus as defined in claim 56 wherein, said lower turret base plate includes a plurality of bearings mounted to said lower base plate, each said bearing corresponding to one spring suspension mechanism, and each said suspension mechanism including a sliding shaft slidably coupled to said corresponding bearing, one end of said sliding shaft mounted to a corresponding support shoe, and an opposite end thereof movably mounted to said frame for movement along said pathway and to enable said sliding and reciprocating movement of said corresponding support shoe in the direction of said axis and toward said second surface of said second conveyor assembly.

58. The rotary lid sealing apparatus as defined in claim 57 wherein, said frame includes a cam track extending in the direction of said circular pathway, each said sliding shaft includes a first shaft mounted to said corresponding support shoe and a second shaft movably mounted to said cam track, said first shaft and said second shaft being axially aligned and formed to slidably cooperate for movement of said first shaft between a retracted position and an extended position, and each said suspension mechanism further includes a constant tension spring biasing device coupled between said first shaft and said second shaft for biasing said first shaft toward said extended position, and providing said constant fusing pressure between said can and said seated lid as said lid abuts against said second conveyor second surface upon moving engagement between said second shaft and said cam track which urges said first shaft toward said retracted position.

59. The rotary lid sealing apparatus as defined in claim 58 wherein, each second shaft includes a cam mechanism movably mounted to said cam track for providing moving support of said corresponding support shoe as it travels along said circular pathway, said cam track having an engaging portion formed to cause said second shaft and said support shoe to move toward the second surface of said second conveyor until said lid contacts said second surface while said spring biasing device enables said constant fusing pressure between said can and said lid as the respective sliding shaft, support shoe and suspension mechanism move along said pathway as a unit.

60. The rotary lid sealing apparatus as defined in claim 59 wherein, each said cam mechanism includes a pair of opposing rollers rotatably mounted to said cam track to provide rolling support of said sliding shaft and said support shoe as they move along said pathway.

61. The rotary lid sealing apparatus as defined in claim 59 wherein, each said biasing device includes a low pressure compression spring and a high pressure compression spring, said low pressure compression spring is dimensioned to be depressed between said first shaft and second shaft to provide said constant fusing pressure when said cam mechanism engages said engaging portion of said cam track, while said high pressure compression spring dimensioned to be free of depression between said first shaft and second shaft uninfluencing said constant fusing pressure when said cam mechanism engages said engaging portion of said cam track, and said cam track further includes a second engaging portion formed to further urge said first shaft toward said retracted position until said high pressure compression spring is caused to depress between said first shaft and second shaft to provide a substantially constant high pressure between said lid and said can open end substantially greater than said constant fusing pressure caused by said low pressure compression spring to improve fusing adhesion therebetween.

62. The rotary lid sealing apparatus as defined in claim 61 further including:

a pressure bump device mounted to said frame at a position along said pathway in alignment with said second engaging portion of said cam track, and operably coupled to said second conveyor assembly to provide additional support to said second surface for prevention of deflection thereof as each can passes through the substantially constant high pressure region of said pathway.

63. The rotary lid sealing apparatus as defined in claim 62 wherein, said pressure bump device includes a roller pad assembly mounted to said frame, and in rolling contact with a backside surface of said second conveyor assembly opposite said second surface to substantially prevent deflection of said second surface thereof as the can and lid pass therethrough as a unit.

64. The rotary lid sealing apparatus as defined in claim 61 wherein, said low pressure compression spring is dimensioned of an untensioned height ($H_1$), and said high pressure compression spring is dimensioned of an untensioned height ($H_2$) which is less than said ($H_1$).

65. The rotary lid sealing apparatus as defined in claim 61 wherein, said second shaft is a cam follower shaft, said first shaft is a tube shaft defining a bore formed and dimensioned for sliding receipt of said second shaft therein, and said low pressure and said high pressure compression springs are operably and concentrically positioned in said shaft bore having one end contacting said first shaft.

66. The rotary lid sealing apparatus as defined in claim 56 wherein, said upper turret base plate defines a plurality of pockets circumferentially positioned about said axis, each pocket aligned with a corresponding support shoe for receipt and support of said can and said lid therein.

67. A method of fusing a heat-sealable lid to an open end of a metallic can using a lid sealing apparatus including a frame, a first conveyor assembly coupled to said frame having a first surface for supporting and moving said can along a pathway, and a second conveyor assembly, coupled to said frame, adjacent to and extending along said first conveyor assembly, said second conveyor assembly including an opposed, induction heat-resistant second surface in moving relation to said first surface for further support of said can between said first and second conveyor assemblies along said pathway, said method comprising the steps of:

positioning the lid on said can open end;

placing said can and said lid between said first conveyor first surface and said second conveyor second surface for transport along said pathway;

inducing a current on said can along a portion of one of said first surface and said second surface to heat said can to a temperature sufficient to thermally fuse said lid to said can open end; and holding said lid against said open end of said can at a substantially constant fusing pressure, regardless of variations in can height, between said can open end and said lid for a duration allowing melting and said thermal fusion of said lid to said can open end as said can and said lid travel as a unit along said pathway between said first and said second conveyor assemblies.

68. The method according to claim 67 wherein, said holding step includes passing said can and said lid through a plurality of individual spring suspension mechanisms individually biasing a segmented first surface of said first conveyor assembly toward said second surface of said second conveyor assembly to provide said constant fusing pressure, each said spring suspension mechanism operably mounted to said frame, and said plurality of individual spring suspension mechanisms being sufficient in number relative to conveyor speed to hold said lid against said can open end for a duration.

69. The method according to claim 67 further including the step of:

synchronizing the speed of passage of said first surface with said second surface through said pathway while carrying said can between said first surface and the opposing second surface.

70. The method according to claim 69 wherein, said synchronizing step is accomplished through a synchronism mechanism operably coupled between said first conveyor assembly and said second conveyor assembly.

71. The method according to claim 69 further including the step of:

providing a substantially constant high pressure region between said lid and said can open end substantially greater than said constant fusing pressure to improve fusing adhesion therebetween through passage through a pressure bump device operably urging one of said first conveyor first surface and said second conveyor second surface toward one of the other of said second surface and said first surface, respectively, said bump device being located at a position along said sealing apparatus where said can has been sufficiently heated to melt and fuse said lid to said can open end.

72. The method according to claim 68 wherein, said first conveyor assembly includes a plurality of independent transversely mounted side-by-side relatively rigid support shoes collectively cooperating to define said first surface.

73. The method according to claim 72 wherein, said second conveyor assembly includes a plurality of independent transversely mounted side-by-side relatively rigid flight bars collectively cooperating to define said second surface.

74. The method according to claim 73 wherein, each said support shoe includes a roller mechanism rotatably mounted at opposing transverse ends thereof to provide rolling support of each shoe as it travels over said spring suspension mechanisms during passage through said pathway, and each spring suspension mechanism includes a pair of individual spaced-apart presser shoes each having a roller surface positioned to engage and provide said rolling support to said corresponding roller mechanism, each independent pair of presser shoes cooperating with adjacent pairs of presser shoes to form said pathway.

75. The method according to claim 74 wherein, each said spring suspension mechanism further includes a spring biasing mechanism disposed between said frame and each said presser shoe for biasing said can and said seated lid against said second conveyor second surface to provide said constant fusing pressure.

76. The method according to claim 75 wherein, each said spring suspension mechanism further includes at least one piston rod having one end mounted to said presser shoe and an opposite end slidably cooperating with said frame for reciprocating movement of said presser shoe toward and away from said second conveyor second surface.

77. The lid sealing apparatus as defined in claim 1 wherein, said support shoes are composed of induction heat-resistent material, and said second conveyor assembly includes a plurality of independent transversely mounted side-by-side relatively rigid flight bars cooperating to define said second surface, and said flight bars being composed of an induction heat-resistent material.

78. The lid sealing apparatus as defined in claim 77 wherein, said induction heat-resistent material of support shoes and said flight bars is provided by high-strength epoxy laminated fiberglass.

79. A lid sealing apparatus for sealing a heat-sealable lid to a can having an open end upon which said lid is to be fused and an opposite end, said sealing apparatus comprising:

a frame;

a first conveyor assembly coupled to said frame and including a plurality of independent support shoes mounted in a side-by-side relation which collectively cooperate to define a segmented first surface for supporting and moving said can along a pathway, each said support shoe having a roller mechanism rotatably mounted thereto for providing rolling support of each shoe as it travels through said pathway;

a second conveyor assembly coupled to said frame adjacent to said first conveyor assembly, said second conveyor assembly including a relatively rigid second surface in opposed moving relation to said first surface for further transport of said can between said first and second conveyor assemblies along said pathway;

a heating element positioned along a portion of one of said first surface and said second surface, and formed to thermally fuse said lid to said can open end; and a plurality of individual spring suspension mechanisms operably coupled to respective support shoes for individually biasing said first surface of said first conveyor assembly toward said second surface of said second conveyor assembly to provide a substantially constant fusing pressure between said can open end and said lid as the two travel as a unit proximate said heating element, said constant fusing pressure being sufficient in duration relative to conveyor speed to hold said lid against said can open end to allow melting and said thermal fusion of said lid to said can open end.

80. The lid sealing apparatus as defined in claim 79 wherein, each said support shoe includes said roller mechanisms rotatably mounted at opposing transverse ends thereof to provide rolling support of each shoe as it travels over said spring suspension mechanisms during passage through said pathway.

81. The lid sealing apparatus as defined in claim 80 wherein, said first drive mechanism comprises a pair of spaced roller chains mounted to said opposing transverse ends of said shoes, each chain operably carrying a respective roller mechanism thereon.

82. The lid sealing apparatus as defined in claim 81 wherein, each spring suspension mechanism includes a pair of individual spaced-apart presser shoes each having a roller surface positioned to engage and provide said rolling support to said corresponding roller mechanism, each independent pair of presser shoes cooperating with adjacent pairs of presser shoes to form said pathway.

83. The lid sealing apparatus as defined in claim 82 wherein, each said spring suspension mechanism further includes a spring biasing mechanism disposed between said frame and each said presser shoe for biasing said can and said seated lid against said second conveyor second surface to provide said constant fusing pressure.

84. The lid sealing apparatus as defined in claim 83 wherein, each said spring suspension mechanism further includes at least one piston rod having one end mounted to said presser shoe and an opposite end slidably cooperating with said frame for reciprocating movement of said presser shoe toward and away from said second conveyor second surface.

85. A lid sealing apparatus for sealing a heat-sealable lid to a can having an open end upon which said lid is to be fused and an opposite end, said sealing apparatus comprising:

a frame;

a first conveyor assembly coupled to said frame and including a plurality of independent support shoes mounted in a side-by-side relation which collectively cooperate to define a segmented first surface for supporting and moving said can along a pathway;

a second conveyor assembly coupled to said frame adjacent to said first conveyor assembly, said second conveyor assembly including a relatively rigid second surface in opposed moving relation to said first surface for further transport of said can between said first and second conveyor assemblies along said pathway;

a heating element positioned along a portion of one of said first surface and said second surface, and formed to thermally fuse said lid to said can open end; and a plurality of individual spring suspension mechanisms operably coupled to respective support shoes for individually biasing said first surface of said first conveyor assembly toward said second surface of said second conveyor assembly, each said spring suspension mechanism including:

a moving support surface providing said moving support to said support shoes, at least two piston rods each having one end mounted to said moving support surface and an opposite end slidably cooperating with said frame for reciprocating movement of said moving support surface toward and away from said second conveyor second surface, and a spring biasing mechanism disposed between said frame and each said moving support surface for biasing said can and said seated lid against said second conveyor second surface to provide a substantially constant fusing pressure between said can open end and said lid as the two travel as a unit proximate said heating element, and sufficient in duration relative to the conveyor speed to hold said lid against said can open end to allow melting and said thermal fusion of said lid to said can open end.

86. A lid sealing apparatus for sealing a heat-sealable lid to a can having an open end upon which said lid is to be fused and an opposite end, said sealing apparatus comprising:

a frame;

a first conveyor assembly coupled to said frame and including a plurality of independent, relatively rigid support shoes mounted in a side-by-side relation which collectively cooperate to define a segmented first surface for supporting and moving said can along a pathway;

a second conveyor assembly coupled to said frame adjacent to said first conveyor assembly, said second conveyor assembly including a relatively rigid second surface in opposed moving relation to said first surface for further transport of said can between said first and second conveyor assemblies along said pathway;

a heating element positioned along a portion of one of said first surface and said second surface, and formed to thermally fuse said lid to said can open end;

a plurality of individual spring suspension mechanisms operably coupled to respective support shoes for individually biasing said first surface of said first conveyor assembly toward said second surface of said second conveyor assembly to provide a substantially constant fusing pressure between said can open end and said lid as the two travel as a unit proximate said heating element, said constant fusing pressure being sufficient in duration relative to conveyor speed to hold said lid against said can open end to allow melting and said thermal fusion of said lid to said can open end; and at least one pressure bump device operably coupled to at least one of said first conveyor assembly and said second conveyor assembly causing a substantially constant high pressure between said lid and said can open end substantially greater than said constant fusing pressure caused by said suspension mechanisms to improve fusing adhesion therebetween, said bump device being located at a position along said pathway where said can has been sufficiently heated to melt and fuse said lid to said can open end.

87. The lid sealing apparatus as defined in claim 86 wherein, said pressure bump device includes a high pressure piston having a piston rod with one end providing moving support to one of each respective support shoe and a respective portion of said second surface passing therethrough and an opposite end slidably cooperating with said frame for reciprocating movement of said one of each respective support shoe and the respective portion of said second surface toward and the away from said second conveyor second surface, and a bump biasing device operably coupled to said piston rod for biasing said rod one end toward one of said second surface and said first surface, respectively, to provide said constant high pressure.

88. The lid sealing apparatus as defined in claim 87 wherein, said piston rod one end includes a first roller pad assembly in rolling contact with said one of each respective shoe and said respective portion of said second surface to provide rolling support therewith as it passes thereby.

89. The lid sealing apparatus as defined in claim 88 wherein, said first roller pad assembly includes a plurality of rows of off-set roller members aligned to rotate in the direction of travel of said pathway.

90. The lid sealing apparatus as defined in claim 88 wherein, said pressure bump device includes a second roller pad assembly mounted to said frame opposing said first roller pad assembly, and in rolling contact with the other one of a respective portion of said second surface and each respective shoe as it passes therethrough.

91. The lid sealing apparatus as defined in claim 90 wherein, each said first roller pad assembly and said second roller pad assembly includes a plurality of rows of off-set roller members aligned to rotate in the direction of travel of said pathway.

92. The lid sealing apparatus as defined in claim 90 wherein, said first roller pad assembly is in rolling contact with each respective support shoe, and said second roller pad assembly is in rolling contact with said respective portion of said second surface.

93. A lid sealing apparatus for sealing a heat-sealable lid to a can having an open end upon which said lid is to be fused and an opposite end, said sealing apparatus comprising:

a frame;

a first conveyor assembly coupled to said frame and including a plurality of independent support shoes mounted in a side-by-side relation which collectively cooperate to define a segmented first surface for supporting and moving said can along a pathway;

a second conveyor assembly coupled to said frame adjacent to said first conveyor assembly, said second conveyor assembly including a relatively rigid second surface in opposed moving relation to said first surface for further transport of said can between said first and second conveyor assemblies along said pathway;

a heating element positioned along a portion of one of said first surface and said second surface, and formed to thermally fuse said lid to said can open end;

a plurality of individual spring suspension mechanisms operably coupled to respective support shoes for individually biasing said first surface of said first conveyor assembly toward said second surface of said second conveyor assembly to provide a substantially constant fusing pressure between said can open end and said lid as the two travel as a unit proximate said heating element, said constant fusing pressure being sufficient in duration relative to conveyor speed to hold said lid against said can open end to allow melting and said thermal fusion of said lid to said can open end;

said first conveyor assembly including a base plate movably mounted to said frame for movement along said pathway, and a plurality of bearings mounted to said base plate, each said bearing corresponding to one spring suspension mechanism; and each said suspension mechanism including a sliding shaft slidably coupled to said corresponding bearing, one end of said sliding shaft mounted to a corresponding support shoe and an opposite end thereof movably mounted to said frame to produce sliding movement of said corresponding support shoe first surface toward said second surface of said second conveyor assembly.

94. The lid sealing apparatus as defined in claim 93 wherein, said frame includes a cam track extending in the direction of said pathway, and each shaft opposite end includes a cam mechanism movably mounted to said cam track for providing moving support of said corresponding support shoe as it travels along said pathway, said cam track having a first engaging portion formed to cause said sliding shaft and said support shoe to move toward the second surface of said second conveyor upon engagement of said cam mechanism therewith to provide said constant fusing pressure as the respective sliding shaft, support shoe and suspension mechanism move along said pathway as a unit.

95. The lid sealing apparatus as defined in claim 94 wherein, each sliding shaft of said suspension mechanism includes a first shaft mounted to said corresponding support shoe and a second shaft movably mounted to said cam mechanism, said first shaft and said second shaft being axially aligned and formed to slidably cooperate for movement of said first shaft between a retracted position and an extended position, and each said suspension mechanism further includes a constant tension spring biasing device coupled between said first shaft and said second shaft for biasing said first shaft toward said extended position, and providing said constant fusing pressure between said can and said seated lid as said lid abuts against said second conveyor second surface upon said cam mechanism engaging said first engaging portion of said cam track which urges said first shaft toward said retracted position.

96. The lid sealing apparatus as defined in claim 95 wherein, said second shaft is a cam follower shaft, said first shaft is a tube shaft defining a bore formed and dimensioned for sliding receipt of said second shaft therein, and said biasing device includes a compression spring operably positioned in said shaft bore having one end contacting said first shaft and an opposite end contacting said second shaft.

97. The lid sealing apparatus as defined in claim 95 wherein, said first conveyor and said second conveyor are rotary conveyors, and said pathway is circular.

98. The lid sealing apparatus as defined in claim 95 wherein, each said biasing device includes a low pressure compression spring and a high pressure compression spring, said low pressure compression spring is dimensioned to be depressed between said first shaft and second shaft to provide said constant fusing pressure when said cam mechanism engages said engaging portion of said cam track, while said high pressure compression spring is dimensioned to be free of depression between said first shaft and second shaft uninfluencing said constant fusing pressure when said cam mechanism engages said engaging portion of said cam track, and said cam track includes a second engaging portion formed to further urge said first shaft toward said retracted position until said high pressure compression spring is caused to depress between said first shaft and second shaft to provide a substantially constant high pressure between said lid and said can open end substantially greater than said constant fusing pressure caused by said low pressure compression spring to improve fusing adhesion therebetween.

99. The lid sealing apparatus as defined in claim 94 further including:

a pressure bump device mounted to said frame at a position along said pathway in alignment with said second engaging portion of said cam track, and operably coupled to said second conveyor assembly to provide additional support to said second surface for prevention of deflection thereof as each can passes through the substantially constant high pressure region of said pathway.

100. The lid sealing apparatus as defined in claim 99 wherein, said pressure bump device includes a roller pad assembly mounted to said frame, and in rolling contact with a backside surface of said second conveyor assembly opposite said second surface to substantially prevent deflection of said second surface thereof as the can and lid pass therethrough as a unit.

101. A method of fusing a heat-sealable lid to an open end of a can using a lid sealing apparatus including a frame, a first conveyor assembly coupled to said frame having a first surface for supporting and moving said can along a pathway, and a second conveyor assembly, coupled to said frame, adjacent to and extending along said first conveyor assembly, said second conveyor assembly including an opposed second surface in moving relation to said first surface for further support of said can between said first and second conveyor assemblies along said pathway, said method comprising the steps of:

positioning the lid on said can open end;

placing said can and said lid between said first conveyor first surface and said second conveyor second surface for transport along said pathway;

heating said can along a portion of one of said first surface and said second surface to a temperature sufficient to thermally fuse said lid to said can open end;

holding said lid against said open end of said can at a substantially constant fusing pressure, regardless of variations in can height, between said can open end and said lid for a duration allowing melting and said thermal fusion of said lid to said can open end as said can and said lid travel as a unit along said pathway between said first and said second conveyor assemblies; and providing a substantially constant high pressure region between said lid and said can open end substantially greater than said constant fusing pressure to improve fusing adhesion therebetween.

102. The method according to claim 101 wherein, said substantially constant high pressure is accomplished by passing said can and lid through a pressure bump device operably urging one of said first conveyor first surface and said second conveyor second surface toward one of the other of said second surface and said first surface, respectively, said bump device being located at a position along said sealing apparatus where said can has been sufficiently heated to melt and fuse said lid to said can open end.

103. The method according to claim 101 wherein, said holding step includes passing said can and said lid through a plurality of individual spring suspension mechanisms individually biasing a segmented first surface of said first conveyor assembly toward said second surface of said second conveyor assembly to provide said constant fusing pressure, each said spring suspension mechanism operably mounted to said frame, and said plurality of individual spring suspension mechanisms being sufficient in number relative to conveyor speed to hold said lid against said can open end for a duration.

104. The method according to claim 101 further including the step of:

synchronizing the speed of passage of said first surface with said second surface through said pathway while carrying said can between said first surface and the opposing second surface.

* * * * *